United States Patent [19]

Driscoll et al.

[11] Patent Number: 4,945,534
[45] Date of Patent: Jul. 31, 1990

[54] PROGRAMMABLE CONFERENCING MODULE FOR RING ARRAYS AND SWITCHABLE RING ARRAY NETWORKS

[75] Inventors: John L. Driscoll, Jeannette; Edward K. H. Law, Monroeville, both of Pa.; Gerald M. Masson, Baltimore, Md.; Giorgio L. Coraluppi, Pittsburgh; Michael A. Kancel, Bridgeville, both of Pa.

[73] Assignee: Compunetics, Inc., Monroeville, Pa.

[21] Appl. No.: 383,230

[22] Filed: Jul. 19, 1989

Related U.S. Application Data

[63] Continuation of Ser. No. 94,984, Sep. 10, 1987, abandoned.

[51] Int. Cl.⁵ .......................................... H04Q 11/04
[52] U.S. Cl. ..................................... 370/62; 370/85.5; 370/85.12; 379/207
[58] Field of Search ....................... 370/62, 56, 57, 58, 370/86, 88; 379/202, 203, 204, 207; 340/825.05

[56] References Cited

U.S. PATENT DOCUMENTS

| | | | |
|---|---|---|---|
| 3,971,895 | 7/1976 | Hollis | 379/203 |
| 3,997,730 | 12/1976 | Stidham | 370/62 |
| 4,048,449 | 9/1977 | Natebusch | 370/62 |
| 4,466,092 | 8/1984 | Renner | 370/62 |

Primary Examiner—Joseph A. Orsino
Assistant Examiner—Frank M. Scutch, III
Attorney, Agent, or Firm—Reed Smith Shaw & McClay

[57] ABSTRACT

The present invention pertains to a conferencing network. The conferencing network is comprised of a ring array comprised of K conferencing modules, where K is greater than or equal to 3 and is an integer. The K conferencing modules are capable of being in desired states. The conferencing network also includes means for controlling the ring array such that the conferencing modules are placed in the desired states. Switching stages comprised of switches can also be implemented into the conferencing network.

26 Claims, 28 Drawing Sheets

PROGRAMMABLE CONFERENCING MODULE FOR RING ARRAYS AND SWITCHABLE RING ARRAY NETWORKS

This is a continuation of copending application Ser. No. 094,984, fled on Sept. 10, 1998, now abandoned.

FIELD OF THE INVENTION

The present invention is related to conference modules. More specifically, the present invention relates to conference modules that are capable of being linked to form a conferencing network.

BACKGROUND OF THE INVENTION

In multiple port switching networks, ports are usually linked together in pairs in what can generically be referred to as a transmit/receive arrangement. In such a connection, one of the ports serves as a source of for example, voice/data information while the other port serves as a destination in a communication process. These roles can be exchanged during the communication process.

There exists a class of communication requirements where the connectivity is much more demanding than simple port pairing in that groups of more than two ports must be linked together in a conference. In a conference, three or more ports are involved in the communication process. Any given port may at various times transmit to all other ports in the conference. There have been a variety of techniques developed to deal with the greater demands of the connectivity of a conference. Phiet U.S. Pat. No. 4,644,530 discloses an instant speaker algorithm for a digital conference bridge. The digital conference bridge is for use with a plurality of telephones and arranged whereby, the output signal from one telephone is directed to the remainder of the telephones and the output signals of the remainder are suppressed.

U.S. Pat. No. 4,577,065 discloses a meet-me conference arrangement. The meet-me conference arrangement is for use in a telephone switching office. An access code is assigned to each conference and at an agreed upon time, all conferees for a conference dial the same access code. The switching office allocates a bridging system in response to the first call to arrive at the office.

Barangai et al U.S. Pat. No. 4,575,845 discloses a time division multiplex conference. The time division multiplex conference continuously sums and outputs digital message samples received from N subscribers in N respective time slots. Message samples collected from each subscriber of a conference connection are summed during a first time frame and outputted during a second time frame.

Reed U.S. Pat. No. 4,339,816 discloses a conferencing apparatus and methods for a frequency division multiplex communications system. The conferencing apparatus employs a first available band sideband for communication and a second sideband for signaling. Each subscriber in the system has dual receiving and transmitting equipment which enables a subscriber to communicate with any other subscriber.

Herr et al U.S. Pat. No. 4,544,804 discloses a conference control transfer arrangement. The conference arrangement has certain speaker priorities and control capabilities provided to the originator. The originator under the guidance of voice prompts, can transfer this control to another party on the conference.

The problem that exists in current conferencing apparatus is the limitation to the number of parties to the conference due to the increase in noise and breakdown of signal level control. The present invention is a conferencing module which is capable of providing, among other features, the necessary combining of information signals together with appropriate signal level controls and filtering to satisfy conference requirements. The invention can be used as a building block module for the design of conference arrays or they can be inserted into multistage switching networks not explicitly designed for conferencing to raise their functionality to a more general capacity.

SUMMARY OF THE INVENTION

The present invention pertains to a conferencing network. The conferencing network is comprised of a ring array comprised of K conferencing modules, where K is greater than or equal to 3 and is an integer. The K conferencing modules are capable of being in desired states. The conferencing network also includes means for controlling the ring array such that the conferencing modules are placed in the desired states.

In another embodiment, there are included N additional ring arrays, where N is greater than or equal to 1 and is an integer. Each ring array is then linked to another ring array and the controlling means controls the conferencing modules of the ring arrays such that the conferencing modules are placed in the desired states. The ring arrays can also be linked to form weaved arrays.

In another embodiment, switching stages having S switches capable of being in a desired connection, where S is greater than equal to 1 and is an integer, are included with the ring arrays.

In a more preferred embodiment stations having transmit ports and receive ports are linked to the ring arrays or switching stages to achieve desired conferences between the stations.

In an alternative embodiment, open ring arrays are utilized with or without switches to form conferencing networks for conferences.

DESCRIPTION OF THE PREFERRED EMBODIMENT

Figure 1:
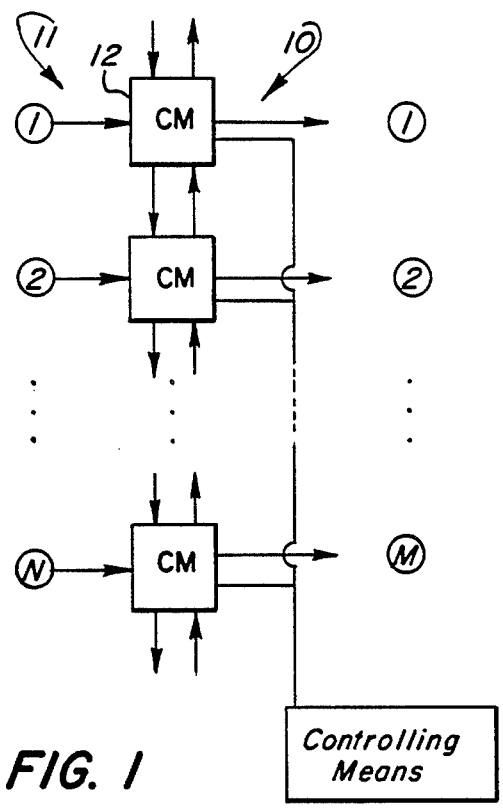
FIG. 1 is a schematic diagram of a conferencing network having a ring array.

Referring now to the drawings, wherein like reference numerals designate identical or corresponding parts throughout the several views, and more particularly to FIG. 1 thereof, a conferencing network 11 is shown therein. The conference network 11 is comprised of a ring array 10 comprised of K conferencing modules (Cmas denoted in the figures) 12 capable of being in desired states, where K=3 and an integer; and means for controlling the ring array 10 such that the conferencing modules 12 are placed in the desired states.

Figure 2:
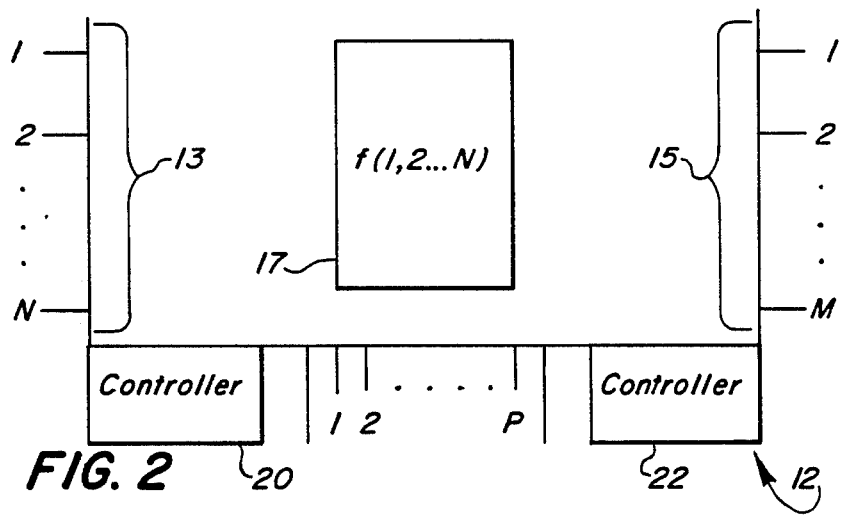
FIG. 2 is a schematic diagram of a programmable conferencing module.

The programmable conferencing module 12 has 1 through N inputs 13 and 1 through M outputs 15 as shown in FIG. 2. The programmable conferencing module 12 has 1 to P functions 17 that can be chosen and applied to any combination of the 1 through N inputs 13. The programmable conferencing module 12 also has a first controller 20 for determining what combination of inputs 13 are to have a desired function applied to them and a second controller 22 which determines on which of the 1 through M outputs 15 the resultant signal that the desired function has produced shall appear. Such a programmable conferencing module 12 is able to provide up to $(N+1+(2^N-N+1))P)^M$ states. For example, if N and M 3, then the number of states is 512. A state is a distinct and unique output signal that the programmable conferencing module 12 is capable of producing based on the inputs and the functions applied to them. The input signals that produce the output signal can have no function applied to them and only be conducted through desired connections to the output ports, or be conducted as well as have a function applied to them. Here, as an example, the functional expression $f(A_i, B_i)$ is meant to imply some programmable functional operation performed on the signals $A_i$ and $B_i$. It should be understood that in many applications, only a subset of all the possible states might be of use. For example, in FIG. 6, six states of the programmable conferencing module are shown. These six states are sufficient for the implementation of the general talk and listen conferences. If conferences in which some conferees were to be placed on a "listen only" mode, the additional programmable conferencing module states also have to be realizable.

The term "conferencing" used herein is meant to generically imply the combining of communication signals in some controlled functional manner. The resulting composite signal represents a "conference."

A programmable conference module 12 performs the functional operations on the communication signals in a predetermined (i.e., programmed) manner and provides for the following: (i) links from the transmit ports from which the signals have emanated; (ii) links to the receive ports to which the conferences must be transmitted; (iii) links to and from the conference modules such that partial conferences of signals can be completed.

Figure 3:
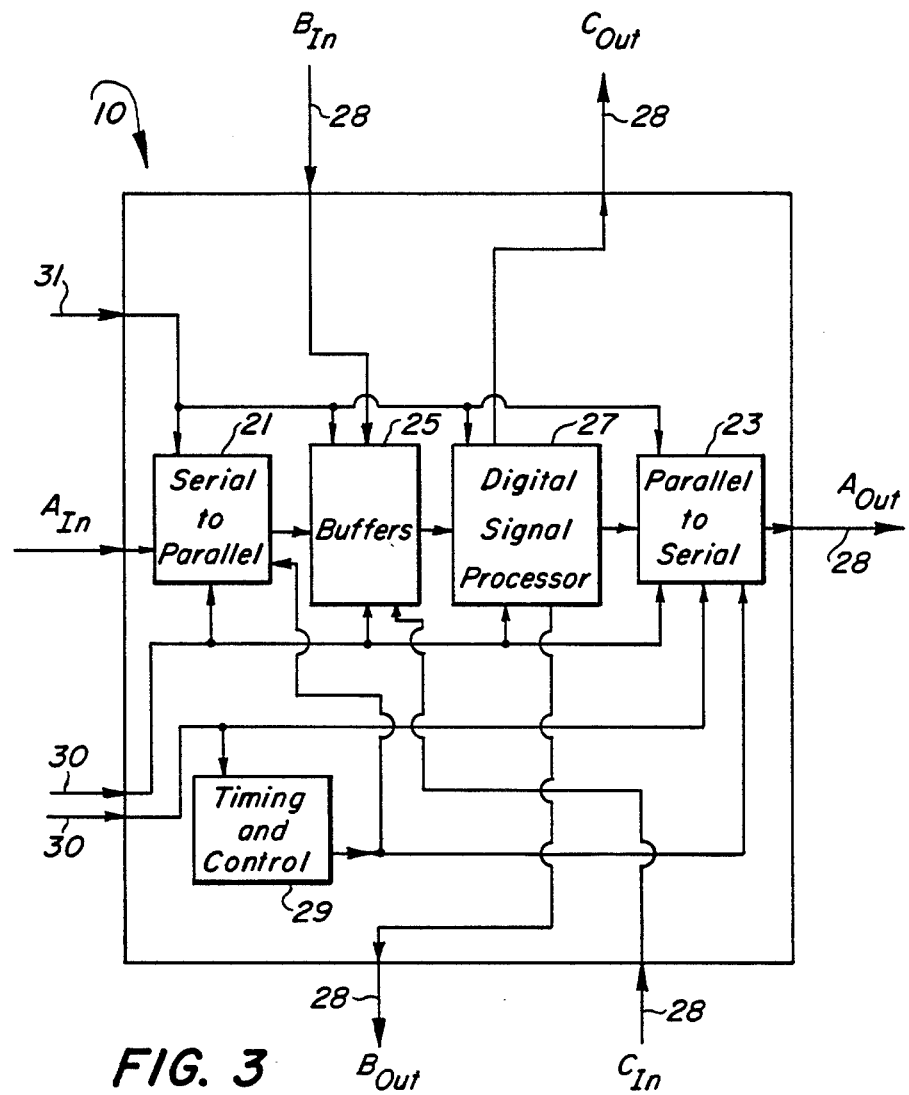
FIG. 3 shows a general programmable conferencing module.

FIG. 3 shows a general programmable conferencing module 10. In general, the links to station receive ports 24 and from station transmit ports 26 are serial communication lines. The links to and from other programmable conference modules are parallel communications lines or links 28. The programmed functional operations on communication signals that are inputted into a conferencing module uses a serial to parallel converter 21 and a parallel to serial converter 23. The parallel data upon which the functional operations take place are buffered 25 before being presented as inputs to the digital signal processor 27. These conversions to/from serial/parallel representations of the communication signals take place under the auspices of the timing and control logic 29. This logic 29 is controlled by means of the control input lines 30. All operations in the programmable conference module 12 are synchronized by means of the clock input line 31.

The conference modules 12 must combine the information signal combinations which correspond to the conferences in such a way that the resulting signal is understandable. The details of this signal combining are application dependent. An example of such signal combining is to use various digital signal processing techniques. This could be accomplished using a programmable digital signal processor 27, examples of which are the Texas instrument TMS32010 or the Motorola DSP56000. This permits the high-speed numeric intensive operations associated with digital signal processing to be implemented in an efficient and flexible manner. These operations include noise control, power level adjustment, code linearization, filtering, spectral analysis, encryption signal transforms (fast Fourier transforms), and signal correlations. To execute such operations requires that the digital signal processor 27 be programmed. This could be accomplished by means of serial input port or could result from using separate control lines to the module.

One application of many possible applications of the programmable conferencing module 12 is the use thereof to form a conferencing network. The application of the programmable conferencing module 12 with respect to a conferencing network describes not only a useful embodiment, but also serves to illustrate the power of the programmable conferencing module 12.

Figure 4:
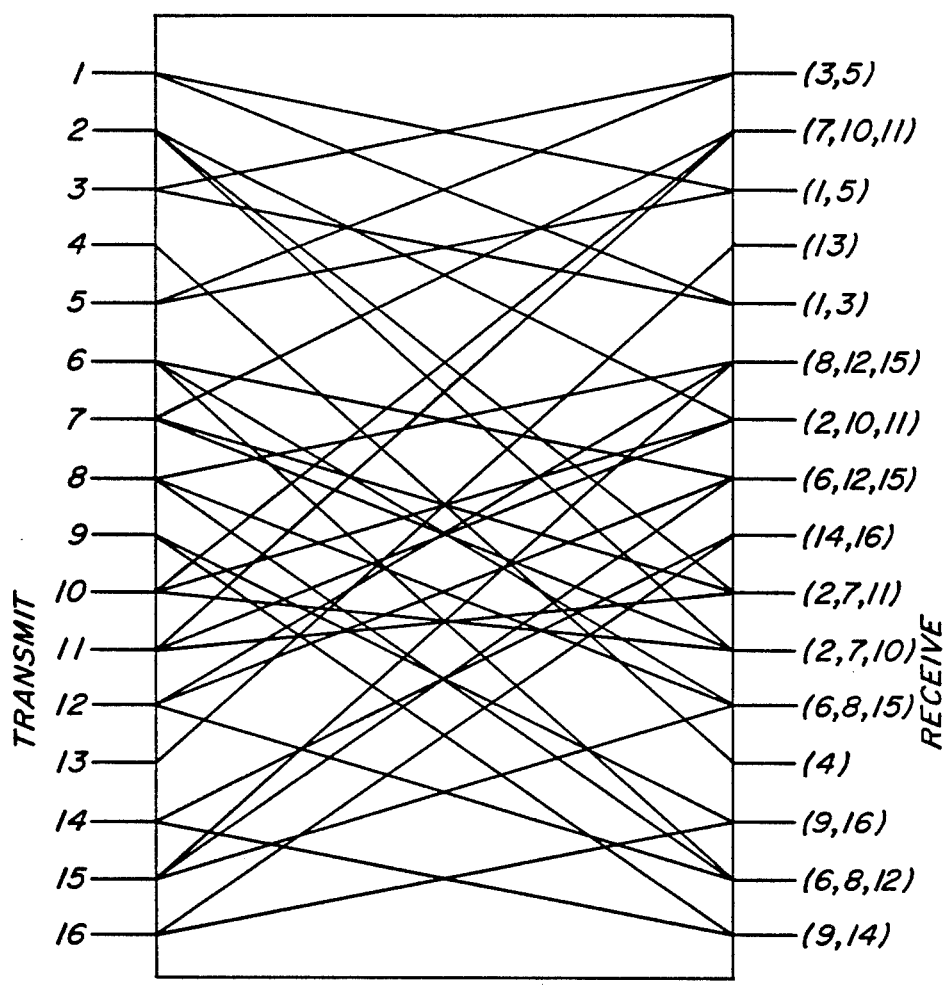
FIG. 4 shows schematically the desired links of several conferences in a conference network.
Figure 5:
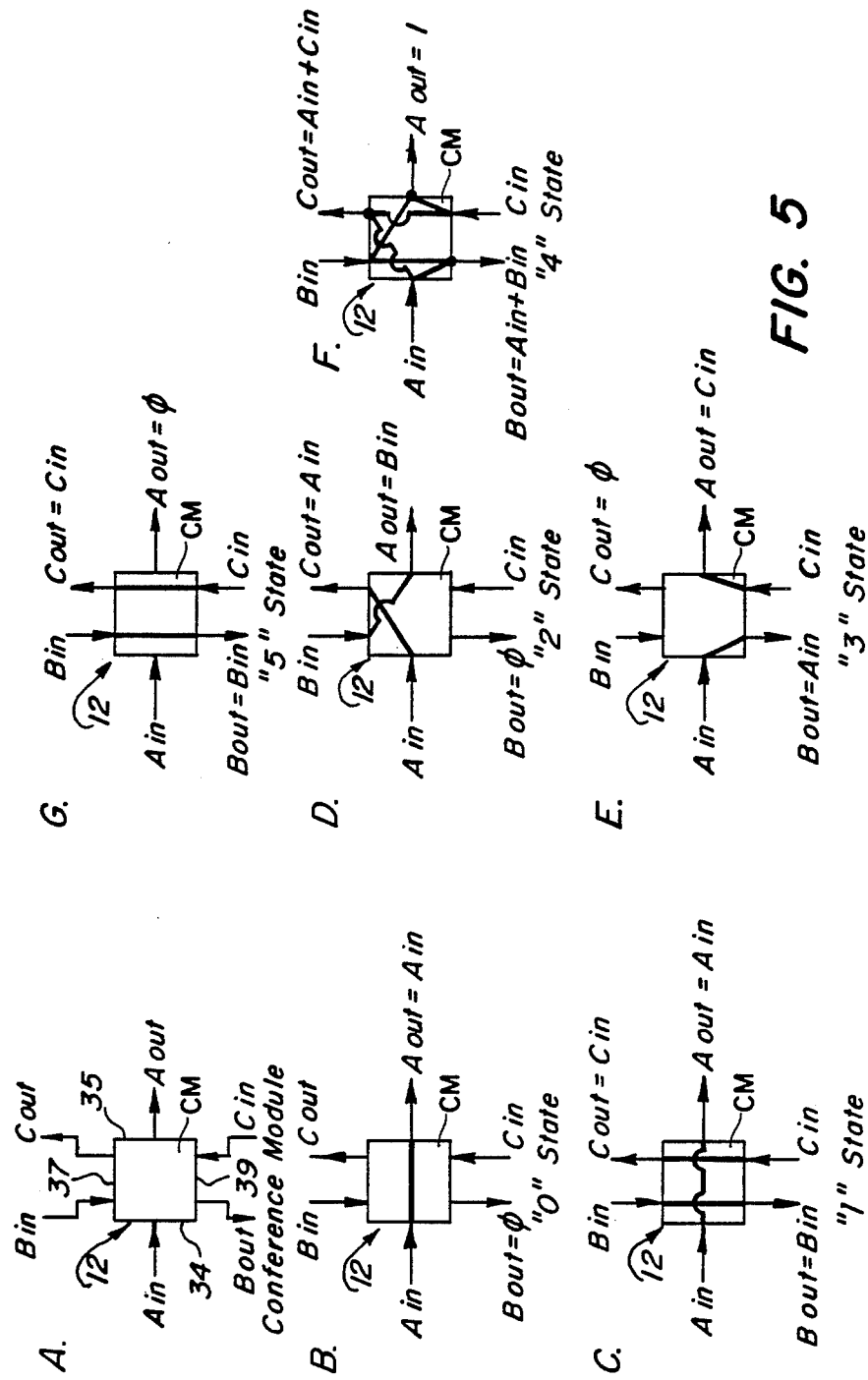
FIG. 5 shows six possible states of a basic conferencing module.

In a conferencing network, it is desired that every station who is part of a conference, meaning who is in communication, for instance telephonically, is able to communicate with every other station in the conference. FIG. 4 shows schematically the desired links of several conferences in a conference network. On the left side of the conferencing network 32 there are, for example, sixteen circles with a number, 1–16, therein. The circle represents a station and the number therein identifies the station. Each station has a transmit port 26 linked to the conferencing network 32. Each transmit port 26 of the 16 stations provides the ability to each station in the conferencing network 32 to transmit signals to the conferencing network 32. On the opposite side of the schematic representation of the conferencing network 32 of FIG. 5 are also 16 circles with receive ports 24. Each circle represents the same station it is opposite to on the left side of FIG. 1, although in each circle on the right side of FIG. 1 are numbers which identify which stations it is receiving signals from. These numbers are receive port sets and are discussed more fully below. The same station is represented as two circles opposite each other in the figure to facilitate understanding of the structure of the network, but in reality the receive and transmit ports of a station are located physically at the same station. Each of the sixteen receive ports 24 of the sixteen stations provides the ability of each station in the conferencing network 32 to receive signals from the other stations.

The following terminology is used to more clearly describe and facilitate understanding of the invention. Any given station that is in conference with another given station is said to have its transmit signals "routed" through the conferencing network to the given station. The transmit signal that is routed through the conferencing network is said to follow a "path" through the conferencing network between the transmit port of a given station and the receive port of a given station. Conference modules 12 or switches 33 are said to be "linked" together when signals are able to be routed from any given conferencing module 12 or switch 33 to any other given conferencing module 12 or switch 33. A link between switches 33 or conferencing modules 12 is represented as a line therebetween in the figures. A link can for example be a copper wire, an optical fiber, a microwave device, etc. Any given input port 13 of a conferencing module 12 or switch 33 is said to be "connected" to any given output port 15 of the same conferencing module 12 or switch 33 when a signal is able to be routed from any given input port 13 to the given output port 15.

In FIG. 4, one conference that is shown is between stations 1, 3 and 5. This is represented by the fact that the station 1 transmit port is linked to the receive ports of station 3 and station 5. Station 3 has its transmit port linked to the receive ports of station 1 and station 5, and the transmit port of station 5 is linked to the receive ports of station 1 and station 3. It should be noted that in this embodiment of a conferencing network 32, the transmit port of each station is not also linked to the receive port of each station because it is assumed that in a communications application the station that is transmitting is aware of what it is transmitting, and thus does not also need to hear or receive its own information. Thus, in FIG. 1 the receive port of station 1 only shows the numbers 3 and 5, that constitute the receive port set, and not 1, 3 and 5, because station 1 is only able to receive from the transmit ports of stations 3 and 5. Similarly, four other conferences are shown in the conferencing network of FIG. 4. There is shown the conferences between stations 2, 7, 10 and 11; stations 4 and 13; stations 6, 8, 12 and 15; and stations 9, 14 and 16 (hereinafter the nomenclature is adopted that such a conference is represented by the form (2, 7, 10, 11); (4, 13); (6, 8, 12, 15); and (9, 14, 16), respectively.)

Accordingly, FIG. 4 describes in general the communication paths that link the stations in conference. Of course, to be an effective conferencing network, when the parties to the network end their discussions and wish to speak to other parties, the conferencing network has the ability to accommodate such changes and achieve again the desired conference.

A conferencing module 12 that has, for instance, three inputs and three outputs potentially is capable of forming 27 separate connections with 512 states. (All three input ports are connected alone or with one or both of the other input ports to each of the output ports). By designing the conferencing module 12 such that there are three input ports and three output ports as is shown in FIG. 5a, a multitude of conferencing network designs using varying numbers of conferencing modules and switches, depending on the costs and the desired parameters of the system can be achieved.

FIG. 5a shows the basic conferencing module 12 with no connections formed between its input ports and its output ports. The conferencing module 12 has an A input port on side 34 and an A output port schematically located on the side 35 opposite the A input port side 34 of the conferencing module 12. The conferencing module 12 also has a B input port located on the side 37 adjacent to the A input port side 34 of the conference module 12 and a B output port on the side 39 adjacent to the A output port side 35 of the conferencing module 12, with the B output port located on the side 39 opposite the side 37 the B input port is located on. There is also a C input port on the same side 39 as the B output port and a C output port located on the same side 37 as the B input port. The functionality of the conferencing module 12 is not specifically identified in the following description of various conferencing networks. Depending on the controls exercised on the network and how the signal processor is programmed for a given application determines the function applied to a given input signal.

FIG. 5b shows the conference module 12 with the A input port connected to the A output port, otherwise known as the 0 state. When the conferencing module 12 is in the 0 state, it is essentially operating as a traditional switch.

FIG. 5c shows the conference module 12 having each input port connected to its respective output port, otherwise known as the 1 state. When an input port is connected to its respective output port, for example, the A input port is connected to the A output port, then the input port and the respective output port are said to form a channel.

In FIG. 5d, the conference module 12 is shown with the A input port connected to the C output port and the B input port connected to the A output port. The B output port and the C input port are dormant. Such a configuration is known as the 2 state. In the 2 state of the conference module 12, the C output corresponds to the A input, and the A output corresponds to the B input.

FIG. 5e shows the conference module 12 having the A input port connected to the B output port and the C input port connected to the A output port. The B input port and the C output port are dormant. This configuration of the conference module 12 is known as the 3 state. In the 3 state, the B output corresponds to the A input and the A output corresponds to the C input.

In FIG. 5f, the conference module 12 is shown with the A input connected to the C output port and the B output port. The B input port is connected to the B output port and the A output port, and the C input port is connected to the C output port and the A output port. This configuration of the conference module 12 is known as the 4 state. In the 4 state, the A output corresponds to the B input and the C input, the B output corresponds to the A input and the B input, and the C output corresponds to the A output and the C output.

FIG. 5f shows the conferencing module in a conferencing state. In general, a conferencing state is present in a conferencing module when at least one input port is connected to at least two output ports.

FIG. 5G shows the conference module 12 with the B input port connected to the B output port and the C input port connected to the C output port. This configuration of the conferencing module 12 is known as the 5 state. In the 5 state the B output corresponds to the B input and the C output corresponds to the C input. The 5 state provides a listen only capability to the conferencing networks since no signals pays through the A output port.

FIGS. 5b, 5c, 5d, 5e and 5g show the conferencing module 12 in various non-conferencing states.

With these six connections defined by the 0 through 5 states of the conference module 12, an entire conferencing network can be created that enables each station of a conferencing network to communicate with or only receive every other station, as is discussed below.

Figure 7:
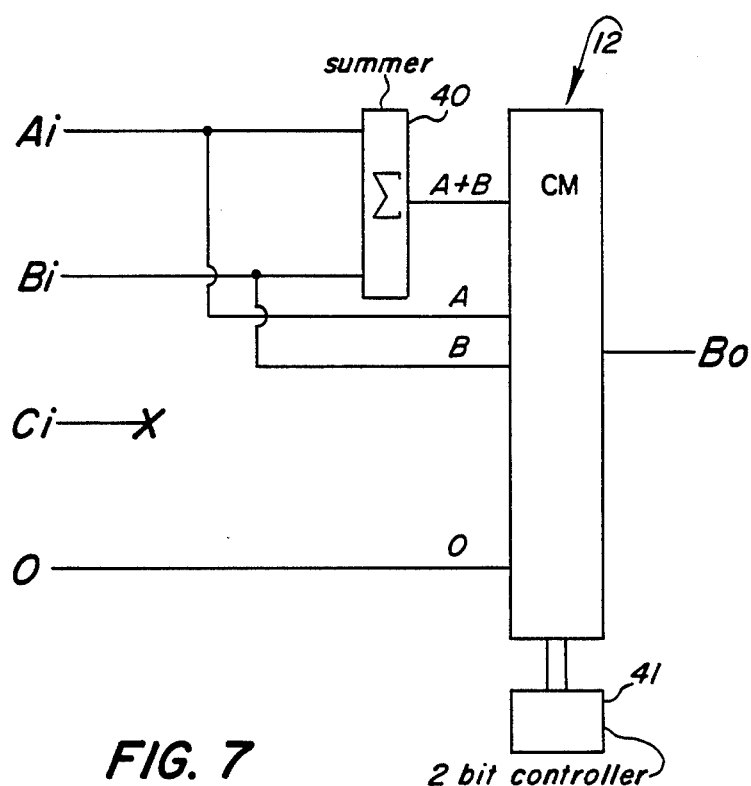
FIG. 7 shows a schematic diagram of a circuit that provides a $B_o$ output port.

Furthermore, the creation of such a conferencing network using just 6 states of a conferencing network enables the conferencing module 12 to be manufactured which is only required to produce these six states. Thus, a great deal of savings can be achieved by eliminating unnecessary electronic elements in the manufacture of the conferencing module. For example, if the only signals that are capable of being routed through an output port of a conferencing module 12 correspond to the following input signals; $A_i + B_i$, $A_i$, $B_i$ or 0, then only electrical elements and connections to achieve such output signals under the proper conditions are needed. (The subscript i denotes input signal.) Referring to FIG. 7 there is shown an example of all the circuitry necessary to achieve the desired outputs for the $B_o$ output port of the conferencing module 12 capable of only the 6 states described above except without a signal processing microchip 27 and thus without functionality. (The subscript o denotes output.) There are only three inputs to the circuit; $A_i$, $B_i$ and 0. The $C_i$ input is not needed because the $B_o$ output signal never corresponds to the $C_i$ input signal. The $A_i$ input and the $B_i$ input are connected to a summer 40 which adds the $A_i$ and $B_i$ inputs to yield the signal A+B. The signal A+B along with the inputs $A_i$, $B_i$ and 0 are connected to a 2-bit controller 41. Depending on the control signal emitted by the 2-bit controller 41, the signal that is chosen to be the B output signal is determined. For instance, the control signals (0,0) (0,1), (1,0), (1,1) cause the B output to be O, B, A and A +B, respectively. Consequently, this requires much less circuitry than the circuitry required to provide for every one of 27 possible connections of the most general case conferencing module 12.

It must be noted that with the conferencing module 12, other connections between the input ports and the output ports forming other states than are shown above in the 0 through 5 states, can be achieved. A conferencing network based on a conferencing module 12 capable of other or additional states can then also be created. The design of the conferencing network shown herein for exemplary purposes follows from the limitations of a conferencing module having only 0 through 5 states. A conferencing module 12 having different connections and thus different states results in a different design of a conferencing network.

With a programmable conferencing module 12, basic structures of ring arrays, open ring arrays and weaved arrays can be formed to implement conferencing networks as are described more fully below. It should be understood that the basic definition of a conference involves the routing and functional manipulation of signals emanating from at least three stations. While the routing and functional manipulation of two signals can be viewed as a two-party or two-station conference, it could nevertheless be manipulated in a ring array or a form thereof as a permutation. Hence, the basic structures presented herein all involve at least three conferencing modules 12 and at least three stations where the requirement of being able to realize a three-station conference is considered mandatory. It is convenient at times in the following to refer to the particular requirement of establishing multiple-station conferences, permutations, or any combination thereof as the assignment to be realized.

Figure 6:
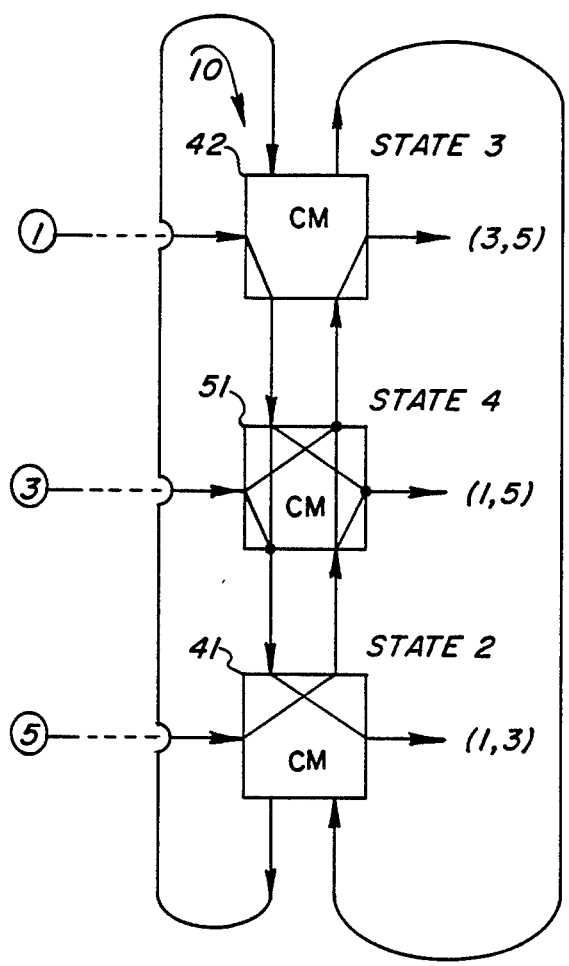
FIG. 6 shows a closed ring array for a three station conference.

Three conferencing modules linked together in vertical fashion to achieve a (1, 3, 5) conference is shown in FIG. 6. Three or more conferencing modules linked in vertical fashion are designated as a ring array 10. A ring array 10 is comprised of at least three conferencing modules 12 linked together such that the B output port of each given conferencing module 12 is linked to the B input port of the conferencing module schematically below the given conferencing module. Similarly, the C output of each given conferencing module is linked to the C input of the conferencing module schematically above the given conferencing module, as is shown in FIG. 6. The B output port of the conferencing module 41 positioned schematically on the bottom of the ring array 10 is linked to the B input port of the conferencing module 42 positioned schematically on the top of the ring array 10. The C output port of the conferencing module 42 positioned schematically on the top of the ring array 10 is linked to the C input port of the conferencing module 41 positioned schematically on the bottom of the ring array 10. In this way the conferencing modules of the ring array 10 can be utilized to provide maximum flexibility to the controller to form the conference networks for a desired conference. A ring array that does not have the conferencing module positioned schematically at the top and the bottom of the ring array linked together is known as an open ring array.

Figure 8:
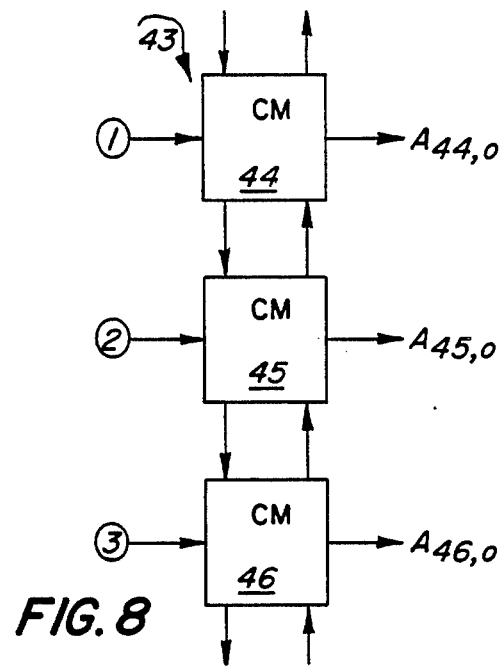
FIG. 8 shows a (3×1) open ring array.

FIG. 8 shows a (×1) open ring array. A (×1) ring array has 3 conferencing modules forming one row. There is a set of three stations, denoted {1,2,3}, and three outputs {$A_{44,o}$, $A_{45,o}$, $A_{46,o}$} which, in an application, could be linked to the receive ports of the stations or to switches of a switching-stage or to other conference modules (or any combination thereof). The (3×1) open ring array can realize a three-station conference, or a two-station conference not in the conference with a pass-through of the signal from the third station, or a permutation of the signals from the three stations to the outputs. A pass-through refers to a signal that is routed through a conferencing module without connecting with any other signals. It should be understood that if a three-station conference is not implemented, than effectively only the routing capability of the (3×1)-open ring array need be utilized to realize the remaining possible assignment of two-station conferences with a pass-through or signal permutation assignment.

Figure 9:
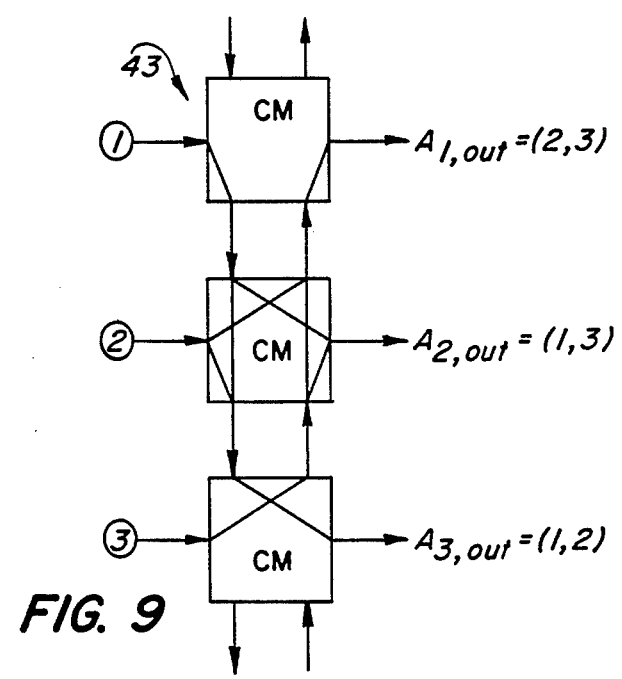
FIG. 9 shows the states of the programmable conference modules for the realization of a three station conference.
Figure 10:
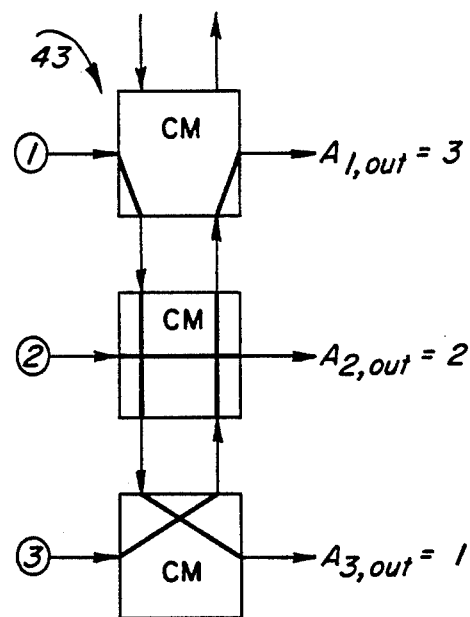
FIG. 10 shows the states of the programmable conference modules for the realization of a single permutation assignment.
Figure 11:
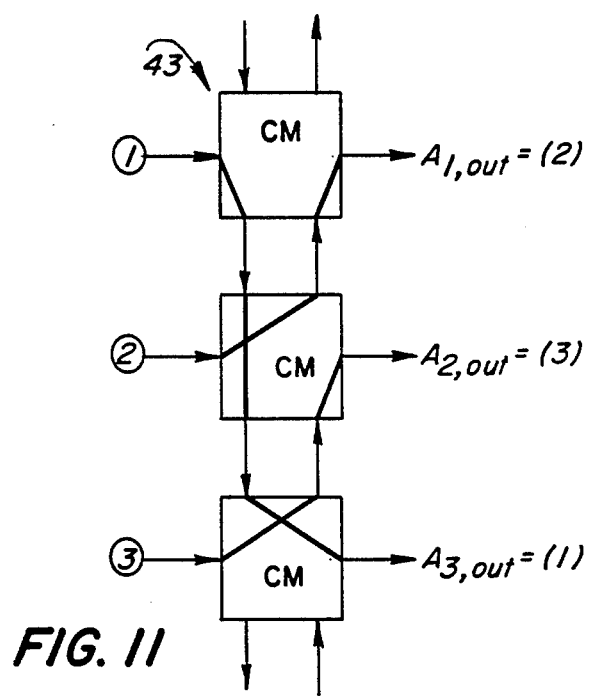
FIG. 11 shows the states of the programmable conference modules for the realization of an alternate single permutation assignment.

FIG. 9 illustrates the states of the programmable conference modules for the realization of a three-station conference. FIG. 10 illustrates the states of the programmable conference modules for the realization of an assignment consisting of a two-station conference with a signal pass-through. FIG. 11 illustrates the states of the programmable conference modules for the realization of a signal permutation assignment.

Figure 12:
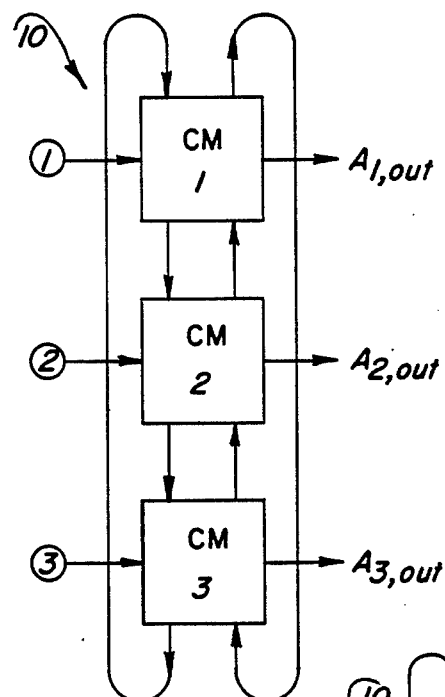
FIG. 12 shows a (3×1) ring array. a ring array.
Figure 13:
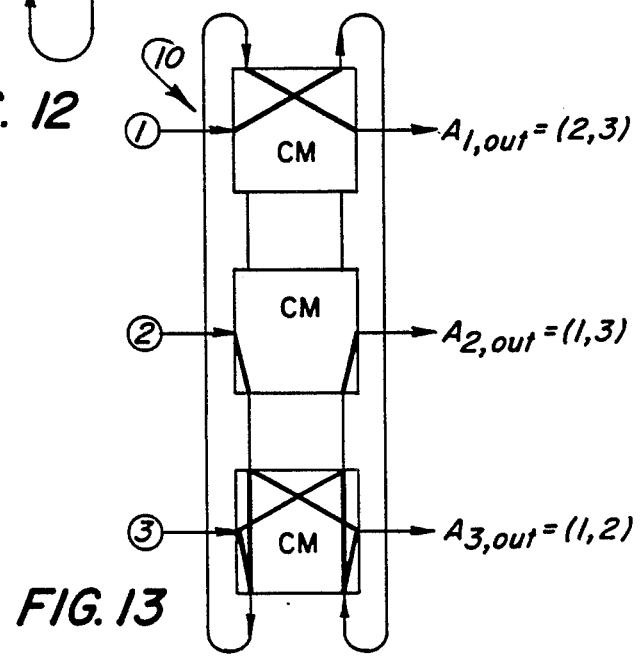
FIG. 13 shows a three station conference utilizing a ring array.
Figure 14:
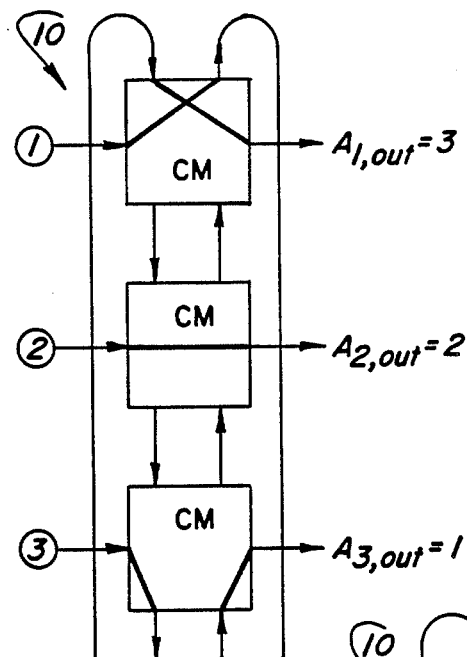
FIG. 14 shows a permutation accomplished with a three ring array.
Figure 15:
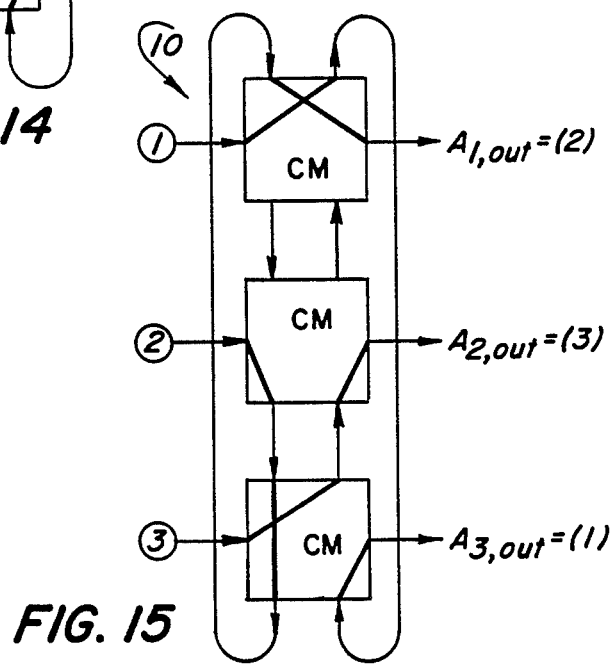
FIG. 15 shows an alternative permutation utilizing a three ring array.

A modification to the open ring array 43 described above which has significant control flexibility ramifications is the ring array 10. FIG. 12 shows a (3×1) ring array 10. Again, a three-station conference or any two-station conference with a pass-through of the remaining signal, or any permutation assignment of the signals emanating from these stations can be realized with this structure. But the advantage of the ring array 10 over the open ring array 43 is that there are more combinations of ring array states for realizations. For example, FIG. 13 shows a three-station conference. Note that this realization utilizes the ring array 10 in the sense that it consists of a different combination of programmable conference module states relative to the realization shown in FIG. 9 on the open-ring array 43. Similarly, FIGS. 14 and 15 show alternative realizations to that shown in FIGS. 10 and 11, respectively, which exploit the ring array 10. The fact that there are multiple states of the ring array 10 for realization of a conference or a permutation has a significant impact on controller design. Namely, the ring array 10 offers an inherent flexibility not available in the open ring array 43 that can be exploited by the control function.

In addition to a single ring array 10, networks of ring arrays 10 can be utilized when a single ring array's capabilities do not satisfy all possible signal assignments. For example, consider a set of 4 stations denoted {1,2,3,4}, and consider the realization of the two-station assignments (1,3) and (2,4) denoted as {(1,3),(2,4)}. It is easily seen that there is no combination of states of programmable conference modules in a (4×1)-ring array 10 or open ring array 43 that can satisfy this assignment. Hence, another basic structure needed for conferencing is a ring array 10 network which can be viewed as networks of ring arrays where the ring arrays are linked in various ways.

Figure 16:
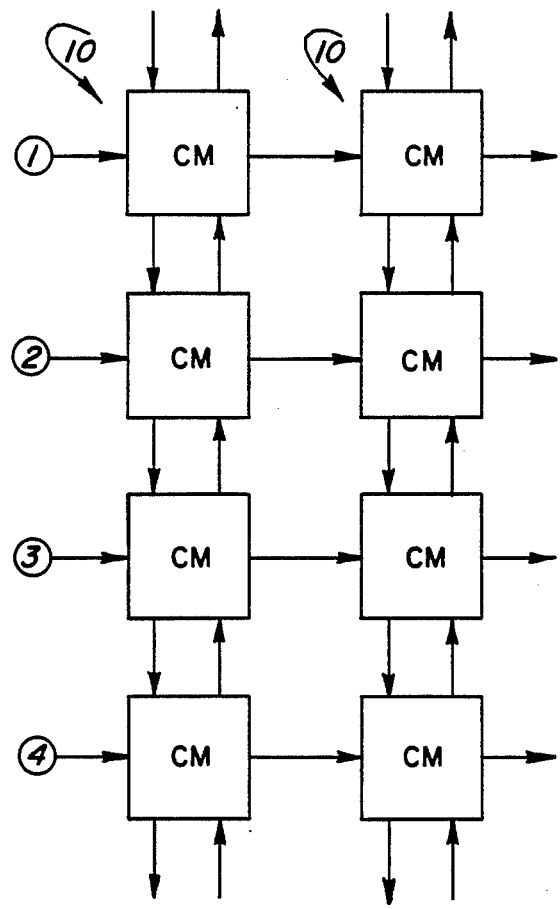
FIG. 16 shows a (4×2) open ring array.
Figure 17:
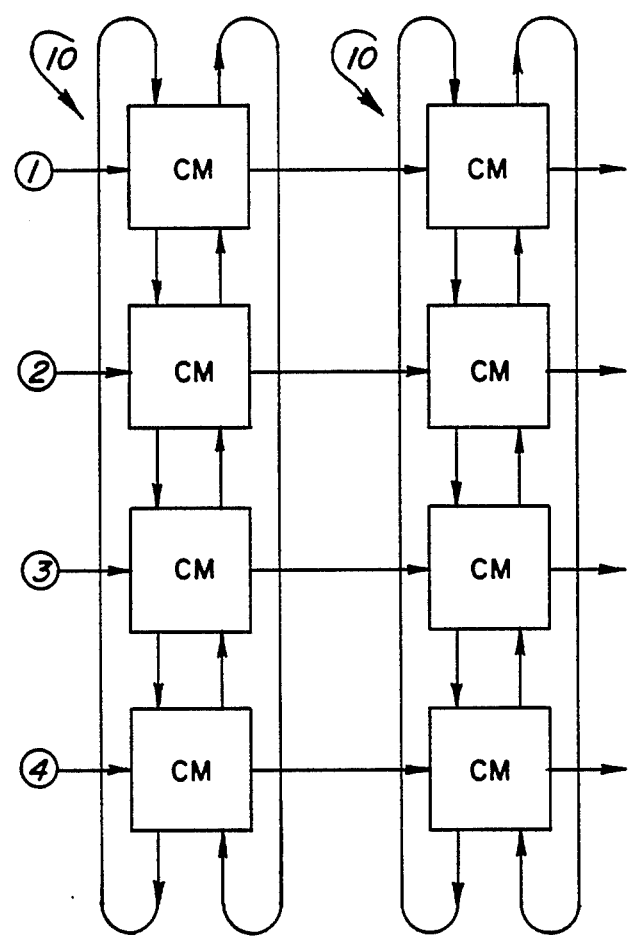
FIG. 17 shows a (4×2)-ring array network.
Figure 18:
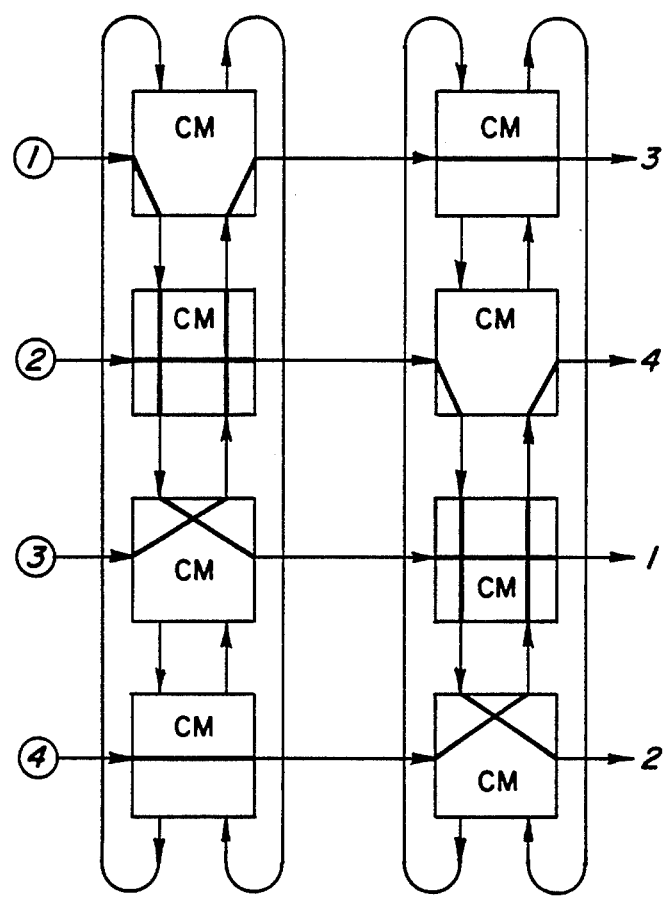
FIG. 18 shows a weaved array.
Figure 19:
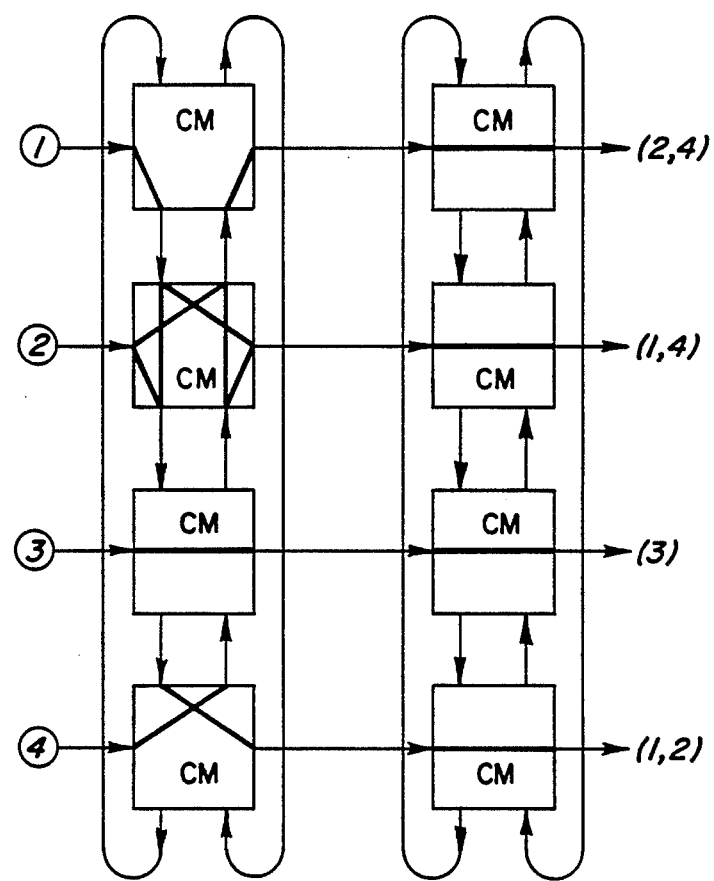
FIG. 19 shows a realization on a (4×2) ring array network.

The two most basic ring networks are the (4×2)-ring array network shown in FIGS. 16 and 17, respectively. These networks consist of two directly linked stages of (4×1)-open ring arrays 43 or ring arrays 10. Clearly, combinations of open ring arrays 43 and ring arrays 10 are also possible. Again, the ring arrays 10 give flexibility of assignment realization that can be exploited by the control function which is not available with open ring arrays 10. FIG. 18 shows a realization of the double assignment {(1,3),(2,4)} with a (4×2)-ring array network. It should be clear that the use of two ring arrays 10 give a larger number of programmable conference module states for the realization of this double two-station conference than that provided by open ring arrays 43. As another example, FIG. 19 illustrates a realization on a (4×2)-ring array network of the assignment consisting of the three-station conference (1,2,4) and a direct pass through of the signal emanating from station 3. This assignment is denoted as {(1,2,4),(3)}.

Figure 20:
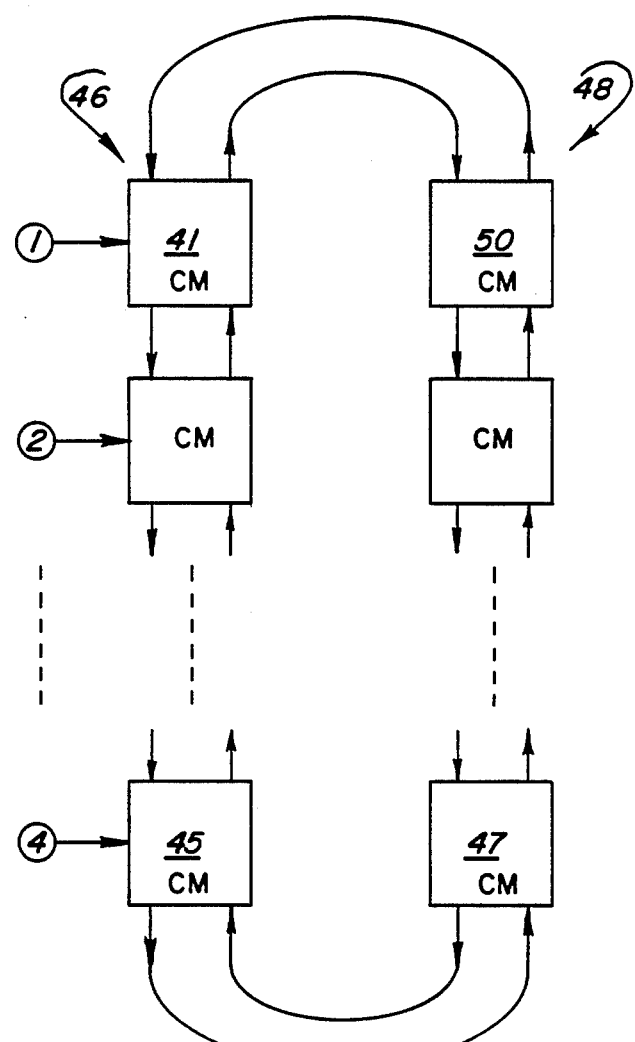
FIG. 20 shows a weaved array.
Figure 21:
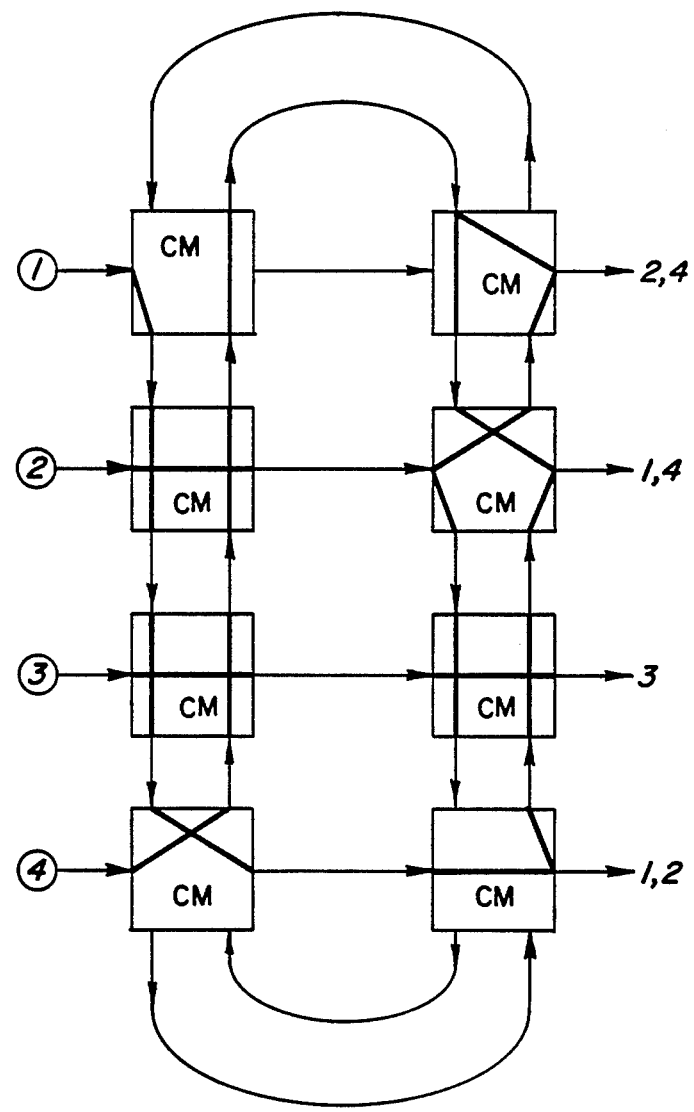
FIG. 21 shows a (4×2)-weaved ring array.
Figure 22:
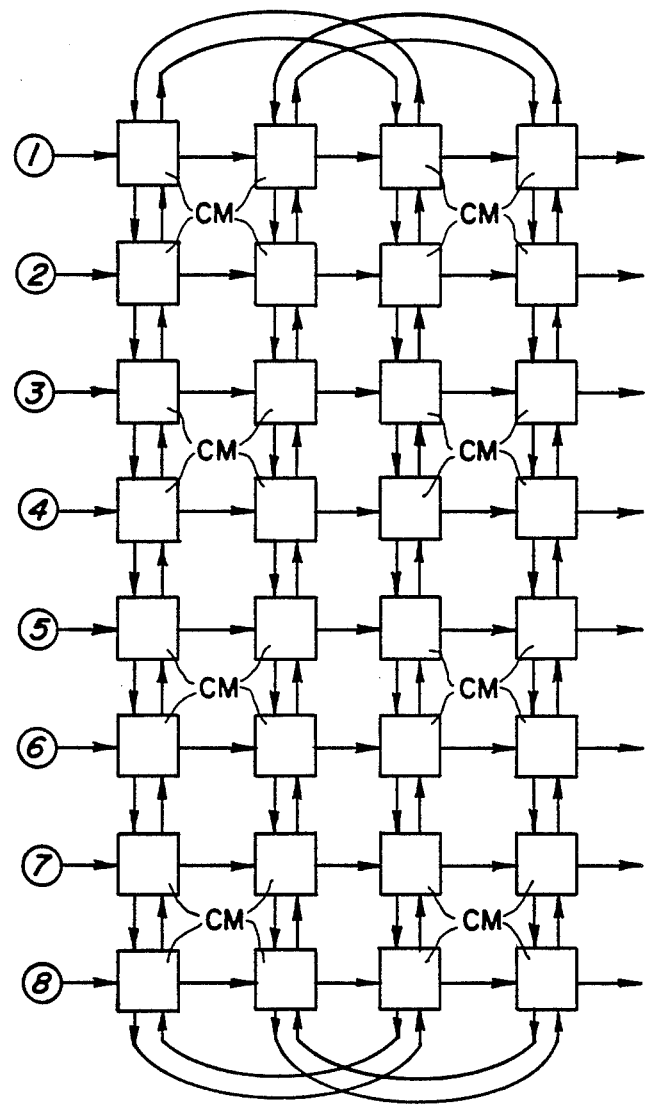
FIG. 22 shows an overlapping weaved array structure.

A ring array 10 that is linked to another ring array 10 through their schematically positioned top and bottom conferencing modules is known as a weaved array 44 as shown in FIG. 20. In a weaved array the B output port and the C input port of a conferencing module 45 schematically positioned on the bottom of a first ring array 46 is linked to the C input port and the B output port, respecting of a conferencing module 47 schematically positioned on the bottom of a second ring array 48. Similarly, the B input port and the C output port of the conferencing module 49 schematically positioned on the top of the first ring array 46 is linked to the C output and B input port, respectively of the conferencing module 50 schematically positioned on the top of the second ring array 48. FIG. 21 shows a (4×2)-weaved ring array 44 realizing the assignment {(1,2,4),(3)}. Of particular importance is the number of different states of the programmable conference modules that are used in the realization of this assignment with the weaved ring array design in comparison to the previous realizations shown. It should be understood that the possible weaving patterns that can be used between ring arrays are quite varied. As another example of a weaved ring network, FIG. 22 shows an overlapping weave array design. It should be noted that signals which are routed in a ring array are said to "flow" in the ring array.

Referring back to FIG. 6, the conferencing module 42 associated with the first station is in state 3. A conferencing module in state 3 typically closes or top ends a conference which has a portion of a path in a ring array 10 or open ring array 43 of conferencing modules. This is because the B input port and C output port thereof are dormant and consequently not carrying any signals into or out of such a conferencing module to another conferencing module above it. Similarly, conferencing module 41 is associated with station 5 and is in state 2. The conferencing module in state 2 typically closes or bottom ends the bottom of a conference which has a portion of a path in a ring array 10 or open ring array 43. This is because the B output port and the C input port of a conferencing module in state 2 are dormant, thus preventing any further link to other conferencing modules located below conferencing module 41.

Conferencing module 51 is associated with station 3 and is in state 4. Conferencing module 51 essentially acts as a bridge conducting signals from conferencing modules above it through to conferencing modules below it by way of channel B, and conducting signals from modules below it to modules above it by way of channel C. A conferencing module in state 4 also enables a signal to be routed out of the vertical flow of signals through its A output port, and to introduce signals from its A input port to the upward flow of signals through connection to output port C and the downward flow of signals through output port B.

By following the connections and links identified in FIG. 6 the desired conferencing network is created for conference (1, 3, 5). From the A input port of module 42, signals pass to the B output port of conferencing module 42. The B output port of conferencing module 42 is linked to the B input port of conferencing module 51. Conferencing module 51 has the B input port connected to the A output port and the B output port. This causes the signal from the A input port to be routed ultimately to the receive port of station 3 through the A output port of conference module 51, and to also be routed down to conferencing module 41 through the connection between the B input port of conferencing module 51 and the B output port of conferencing module 51. The B output port of conferencing module 51 is, in turn, linked to the B input port of conferencing module 41. The B input port of conferencing module 41 is connected to the A output port of conferencing module 41, causing a signal routed through the B input port of conferencing module 41 to be routed to the receive port of station 5. Similarly, the transmit signal from station 5 is routed up to the receive port of station 1 and to the receive port of station 3. The transmit signal from station 3 is directed down to the receive port of station 5 by way of the A input port and B output port conferencing module 51. The B output port of conferencing module 51 is linked to the B input port of conferencing module 41 which is in turn connected to the A output port of conferencing module 41. The A output port of conferencing module 41 is linked to the receive port of station 5. Similarly, the signal from the transmit port of station 3 is routed to the receive port of station 1 via the A input port and the C output port of conferencing module 51, and the C input port and the A output port of conferencing module 42, where the C output port of conferencing module 51 and the C input port of conferencing module 42 are linked.

Figure 23:
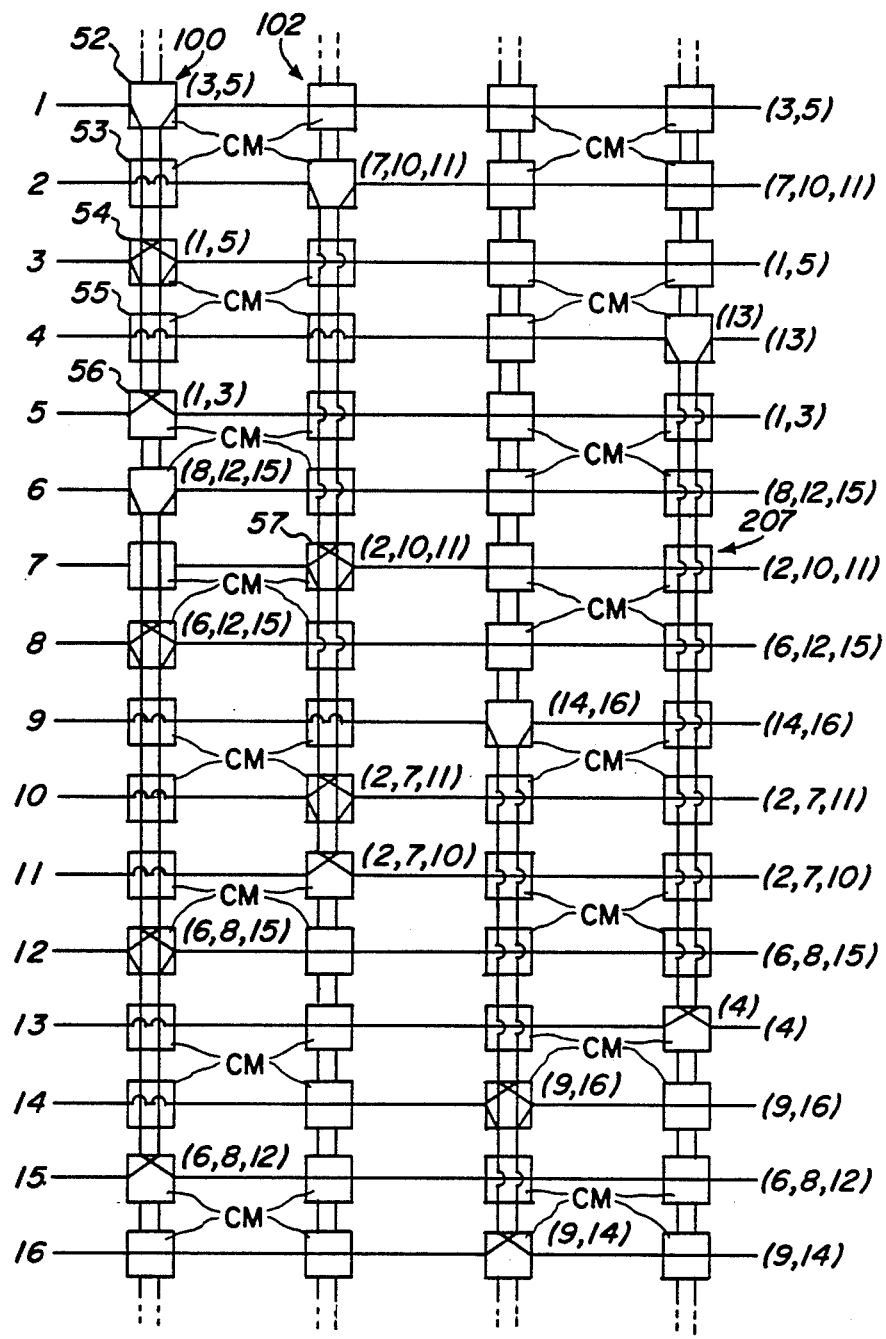
FIG. 23 shows a conferencing network comprised of four ring arrays.

A conferencing network with respect to 16 stations using only conferencing modules is shown in FIG. 23. The conferencing network shown in FIG. 23 is not able to conference every station with every other station since there are N/4 ring arrays 10 of N conferencing modules 10, where N is 16. In order for every station in the conferencing network comprised solely of conferencing modules 12 to conference with every other station than N/2 ring arrays 10 of N conferencing modules 12 is required. Conferences (1, 3, 5); (2, 7, 10, 11); (4, 13); (6, 8, 12, 15); and (9, 14, 16) are illustrated therein. For instance, station 1 which is in conference with station 3 and station 5 has its transmit port linked to the A input port of a conferencing module 52 in the 3 state. The transmit signal from station 1 then is routed from conferencing module 52 to conferencing module 53, which is in the 1 state, via the B input port. The transmit signal is routed directly through conferencing module 53 since conferencing module 53 is associated with station 2 and station 1 is not in conference connection with station 2. The transmit signal of station 1 is received by module 54 associated with station 3 by way of the B input port thereof. Conference module 54 is in the 4 state in order to divert the transmit signal from station 1 to the receive port of station 3, and to also allow the transmit signal of station 1 to be routed through and further down the ring array 100 to station 5. Station 5 is positioned below station 3 in the conferencing network design. The transmit signal of station 1 that is routed through module 54 along its B channel also is routed through module 55 which is in the 1 state because station 4 is not in conference with station 1. From conferencing module 55, the transmit signal of station 1 is routed to conferencing module 56 which is associated with station 5. Conferencing module 56 is in state 2 in order to divert the transmit signal from the 1 station to the receive port of station 5 and also to direct the transmit signal of station 5 up the vertical linear array towards station 1 and 3 which are positioned higher in the ring array 100. As discussed earlier, a conferencing module in state 2 bottom ends a ring array with respect to a conference. This is the case here since stations 1, 3 and 5 are not in conference with any other stations below station 5 in the ring array 100 of the conferencing network.

The transmit signal of station 2 is introduced into the A input port of module 53 and is routed directly therethrough along the A channel thereof. Conferencing module 53 is in the 1 state because station 2 is not in conference with stations 1, 3 and 5 that have signals being routed vertically therethrough along the B and C channels of station 53. Accordingly, the signal from station 2 must be routed along to the next ring array 102 where it is introduced into the vertical flow of the ring array 102. The transmit signal from station 2 then is routed through the ring array 102 to the modules that conduct signals from stations that station 2 is in conference with. This is accomplished by conferencing modules in the 1 state. As the transmit signal from station 2 is routed vertically along the ring array 102 to a station that is in conference with it, the signal is routed out of the vertical flow by a conferencing module 57 in the 4 state, where it is eventually brought to the receive port of station 7. If station 2 is in conference with a station lower down in the ring array 102, then the conferencing module 57 in the 4 state allows the transmit signal of station 2 to also conduct therethrough by way of the B channel to conferencing module lower in the ring array 102 of the conferencing network. As can be seen from FIG. 23, the B channel allows a signal to follow a vertical path in the downward direction and the C channel allows a signal to follow a vertical path in an upward direction. The B and C channels allow the upward and downward flow of signals. The A channel provides the capability to introduce signals into the B and C channels and to extract signals therefrom with respect to the horizontal direction.

Figure 24:
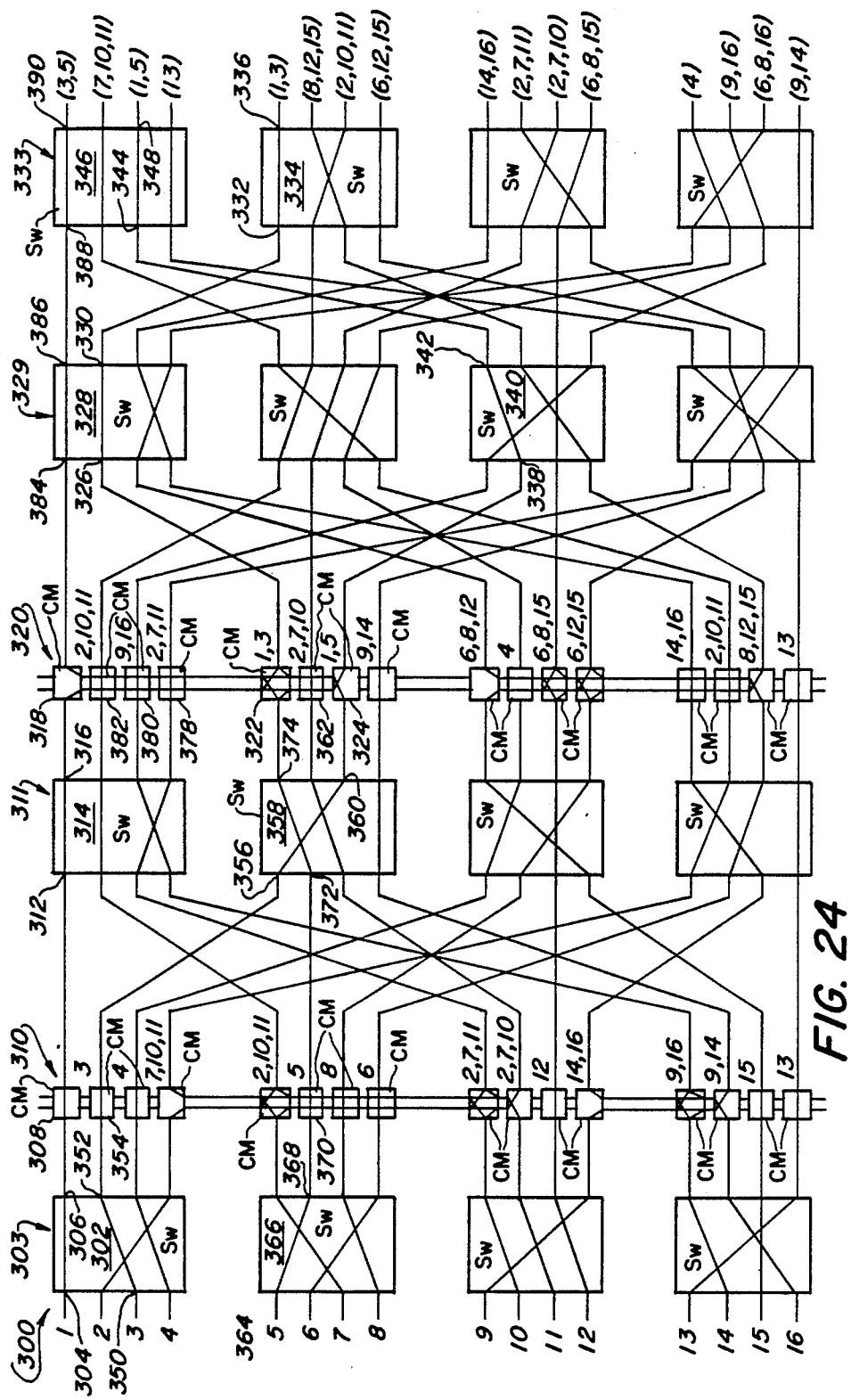
FIG. 24 shows a conferencing network comprised of two ring arrays and four switching stages.

A different embodiment of a conferencing network capable of providing communication between 16 stations is shown in FIG. 24. Conferencing network 300 uses switching stages comprised of switches, (SW as denoted in the figures, and conferencing modules as opposed to the previous embodiment described which uses solely conferencing modules. The typical switch is only capable of connecting one input port to one output port as opposed to the conferencing module which is capable of connecting an input port with every output port. The conferencing network 300 shown in FIG. 5 illustrates conferences for (1, 3, 5); (2, 7, 10, 11); (4, 13); (6, 8, 12, 15); and (9, 14, 69). These are the same conferences that are shown in the previously described conferencing network 200.

Conference (1, 3, 5) is hereafter described in detail with respect to conferencing network 300. As shown in FIG. 5 the transmit port of station 1 is linked to the receive ports of stations 3 and 5 along the following path so a signal can be routed therebetween. The transmit port of station 1 is linked to the first input port of switch 302 in switching stage 303. The first input port 304 is connected to the first output port 306 of the switch 302. The first output port 306 of the switch 302 is linked to the input port of conferencing module 308. Conferencing module 308 is in the 0 state in order to allow the transmit signal from the first station to continue horizontally therethrough, or along the A channel thereof since a ring array 310 does not introduce conference (1, 3, 5) into the vertical flow thereof. The A output port of conferencing module 308 is linked to the first input port 312 of switch 314 of switching stage 311. The first input port 312 of switch 314 is linked to the first output port 316 of switch 314 which is linked to the A input port of conferencing module 318. Conferencing module 318 is in the 3 state causing the inputted signal thereof to be routed from the A input port of conferencing module 318 to the B output port of conferencing module 18. The B port of conferencing module 318 is connected to the B input port of conferencing module 368. Conferencing module 368 is in the I state. The B input port of conferencing module 368 is connected to the B output port of conferencing module 368. The B output port of linked to the B input port of conferencing module 380. Conferencing module 380 is in the 1 state. The B input port of conferencing module 380 is connected to the B input port of conferencing module 378, which is in the 1 state. The B input port of conferencing module 378 is connected to the B input port of conferencing module 378. The B output port of conferencing module 378 is linked to the B input port of conferencing module 322. Conferencing module 322, which is in the 4 state, connects the B input port and the A output port thereof. The B input port of conferencing module 322 is also connected to the B output port of conferencing module 322. The B output port of conferencing module 322 is linked to the B input port of conferencing module 362 which is in the 1 state. The B input port of conferencing module 362 is connected to the B output port of conferencing module 362. The B output port of conferencing module 362 is linked to the B input port of conferencing module 324. Conferencing module 324 is in the 2 state. The B input port of conferencing module 324 is connected to the A output port of conferencing module 324. Conferencing module 322, which is in the 5 state, connects the B input port and the A output port thereof.

The A output port of conferencing module 322 is linked to a second input port 326 of switch 328 of switch stage 329. The second input port 326 of switch 328 is connected to the second output port 330 of switch 328. The second output port 330 of switch 328 is linked to the first input port 332 of switch 334 of switching stage 333. The first input port 332 of switch 334 is connected to the first output port 336 of switch 334, which in turn is linked to the receive ports of stations 1 and 3.

The A output port of conferencing module 324 is connected to the second input port 338 of switch 340. The second input port 338 of switch 340 is linked to the first output port 342 of switch 340. A transmit signal from station 1 then is routed from the first output port 342 of switch 340 to the third input port 344 of switch 346. The third input port 344 of switch 346 is linked to the third output port 348 of switch 346 and is in turn linked to the receive port of station 3, thus allowing the transmit signal station 1 to be received by station 3.

The transmit port of station 3 is linked to the receive ports of stations 1 and 5 along the following path so a signal can be routed therebetween. The transmit port of station 3 is linked to the third input port 350 of switch 302. The third input port 350 of switch 302 is connected to the second output port 352 of switch 302. The second output port 352 of switch 302 is linked to the A input port of conferencing module 354. Conferencing module 354 is in the 0 state, causing the transmit signal of station 3 to conduct from the A input port of conferencing module 354 to the A output port of conferencing module 354. The A output port of conference module 354 is linked to the first input port 356 of switch 358. First input port 356 of switch 358 is connected to the third output port 360 of switch 358. The third output port 360 of switch 358 is linked to the A input port of conferencing module 324 which is in the 2 state. The A input port of conferencing module 324 is connected to the C output port of conferencing module 324. The C output port of conferencing module 324 is linked to the C input port of conferencing module 362. Conferencing module 362 is in the 1 state causing the transmit signal from station 3 to conduct through conferencing module 362 and out the C output port thereof. The C output port of conferencing module 362 is linked to the C input port of conferencing module 322. Conferencing module 322 is in the 4 state causing the transmit signal from the 3 station to be connected to the A output port of conferencing module 322 and the C output port of conferencing module 322.

The A output port of conferencing module 322, which is also linked to the B input port subsequently conducts not only the transmit signal from station 3 but also the transmit signal from station 1. The A output port of conferencing module 322 is linked to the second input port 326 of switch 328. The transmit signal of station 3 then follows the same path the transmit signal of station 1 follows, as previously described, to the receive port of station 5.

The C output port of conferencing module 322 is also linked to the C input port of conferencing module 364 which is in the 1 state. The C input port of conferencing module 364 is connected to the C output port of conferencing module 364. The C output port of conferencing module 364 is linked to the C input port of conferencing module 366. Conferencing module 366 is in the 1 state. The C input port of conferencing module 366 is connected to the C output port of conferencing module 366 and is in turn linked to the C input port of conferencing module 368 which is also in the 1 state. The C input port of conferencing module 368 is connected to the C output port of conferencing module 368. The C output port of conferencing module 368 is linked to the C input port of conferencing module 320 which is in the 3 state. The C input port of conferencing module 320 is connected to the A output port of conferencing module 320. The A output port of conferencing module 320 is linked to the first input port 370 of switch 328. The first input port 370 of switch 328 is connected to the first output port 372 of switch 328. The first output port 372 of switch 328 is linked to the first input port 374 of switch 346. The first input port 374 of switch 346 is connected to the first output port 376 of switch 346. The first output port 376 of switch 346 is linked to the receive port of station 1.

The transmit port of station 5 is linked to the receive ports of stations 1 and 3 along the following path so a signal can be routed therebetween. The transmit port of station 5 is linked to the first input port 364 of switch 366. The first input port 364 of switch 366 is connected to the second output port 368 of switch 366. The, second output port 368 of switch 366 is linked to the A input port of conferencing module 370 which is in the 1 state. Accordingly, the transmit signal of station 5 is routed from the A input port of conferencing module 370 to the A output port of conferencing module 370. The A output port of conferencing module 370 is linked to the second input port 372 of switch 358. The second input port 372 of switch 358 is connected to the first output port 374 of switch 358. The first output port 374 of switch 358 is linked to conferencing module 322 which is in the 4 state. Consequently, the transmit signal of station 5 is connected to the C output port of conferencing module 322 and to the B output port of conferencing module 322. At the B output port of conferencing module 322 the transmit signal from station 5 is routed along with the transmit signal of station 1 and follows the same path hereinafter that the transmit signal from station 1 follows to be received by station 3. Similarly, at the C output port of conferencing module 322 the transmit signal from station 5 is routed with the transmit signal from station 3 along the same path hereinafter that the transmit signal from station 3 follows to be received by station 1 from conferencing module 322. The additional conferences are illustrated in FIG. 5. They are not described in detail since such a description is similar to the description of conference (1, 3, 5), except for the fact that different links and connections of the switch and conferencing modules exist.

Figure 25:
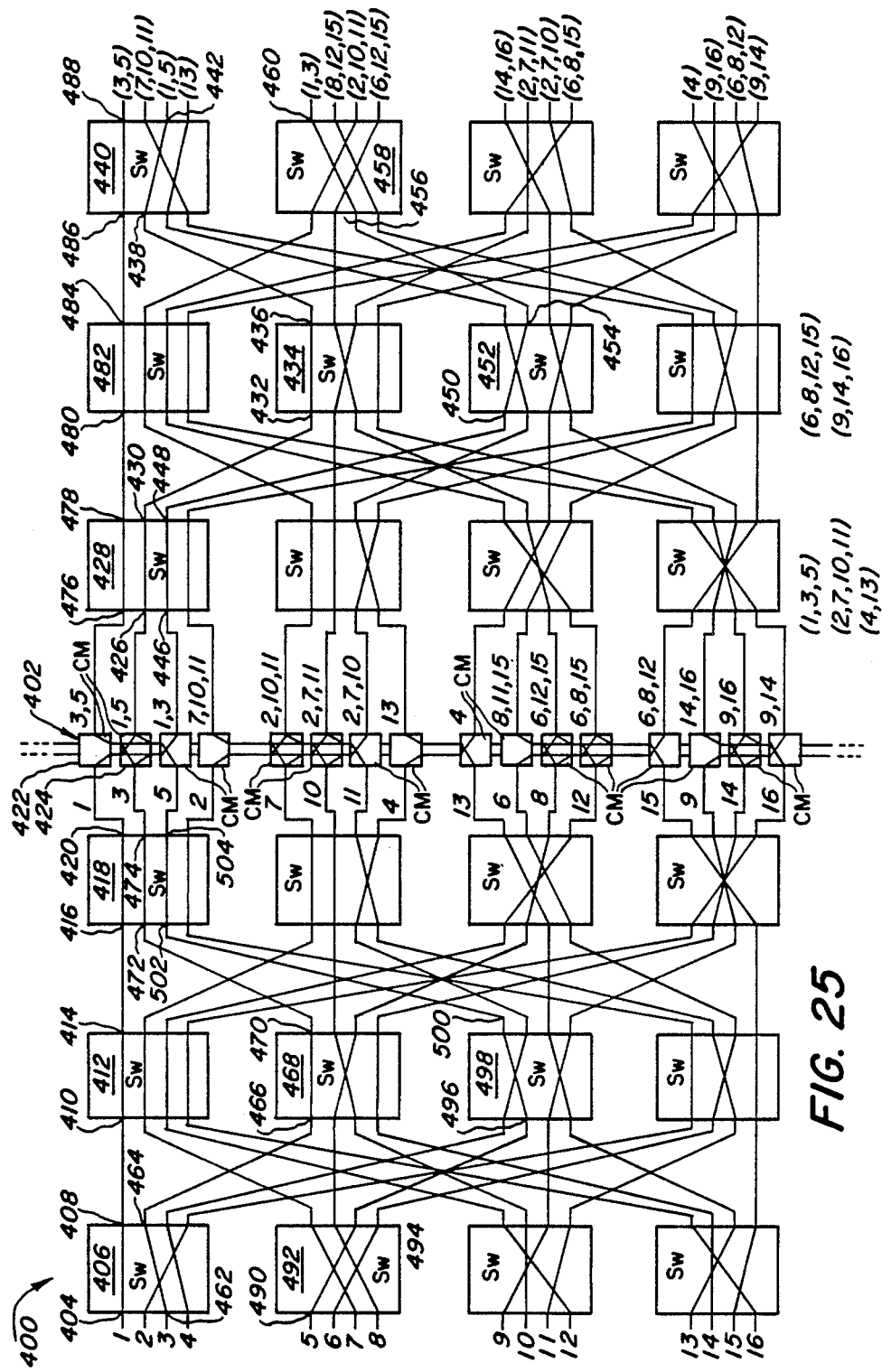
FIG. 25 shows a conferencing network comprised of six switching stages and one ring array.

Another conferencing network that is capable of providing communication between 16 stations is shown in the FIG. 25. Conferencing network 400 illustrates conferences (1, 3, 5); (2, 7, 10, 11); (4, 13); (6, 8, 12, 15); and (9, 14, 16) as does conferencing networks 100 and 300 shown in FIGS. 4 and 5 respectively. Conferencing network 400 uses only one open ring array 402 to accomplish conferencing and relies on switches to supplement the one open ring array 402. Conferencing network 400 is an additional example of attaining any desired conference between 16 stations using the minimum number of conferencing modules. Conference (1, 3, 5) is hereafter described in detail with respect to conferencing network 400.

The transmit port of station 1 is linked to the receive ports of stations 3 and 5 along the following path so a signal can be routed therebetween. The transmit port of station 1 is linked to the first input port of switch 406. The first input port 404 of switch 406 is connected to the first output port 408 of switch 406. The first output port 408 of switch 406 is linked to the first input port 410 of switch 412. The first input port 410 of switch 412 is connected to the first output port 414 of switch 412. The first output port 414 of switch 412 is linked to the first input port 416 of switch 418. The first input port 416 of switch 418 is connected to the first output port 420 of switch 418. The first output port 420 of switch 418 is linked to the A input port of conferencing module 422 which is in the three state. The A input port of conferencing module 422 is connected to the B output port of conferencing module of 422. The B output port of conferencing module 422 is linked to the B input port of conferencing module 424. Conferencing module 424 is in the four state. The B input port of conferencing module 424 is connected to the A output port of conferencing module 424 and the B output port of conferencing module 424.

The A output port of conferencing module 424 is linked to the second input port 426 of switch 428. The second input port 426 of switch 428 is connected to the second output port 420 of switch 428. The second output port 430 of switch 428 is linked to the first input port 432 of switch 434. The first input port 432 is connected to the first output port 436 of switch 434. The first output port 436 of switch 434 is linked to the second input port 438 of switch 440. The second input port 438 of switch 440 is connected to the third output port 442 of switch 440. The third output port 442 of switch 440 is linked to the receive port of station 3.

The B input port of conferencing module 424 is also connected to the B output port of conferencing module 424. The B output port of conferencing module 424 is linked to the B input port of conferencing module 444, which is in the 2 state. The B input port of conferencing module 444 is linked to the A output port of conferencing module 444. The A output port of conferencing module 444 is linked to the third input port 446 of switch 428. The third input port 446 of switch 428 is connected to the third output port 448 of switch 428. The third output port 448 of switch 428 is linked to the first input port 450 of switch 452. The first input port 450 is connected to the second output port 454 of switch 452. The second output port 454 of switch 452 is linked to the third input port 456 of switch 458. The third input port 456 of switch 458 is connected to the first output port 460 of switch 458. The first output port 460 of switch 458 is linked to the receive port of station 5.

The transmit port of station 3 is linked to the receive ports of stations 1 and 5 along the following path so a signal can be routed therebetween. The transmit port of station 3 is linked to the third input port 462 of switch 406. The third input port 462 of switch 406 is connected to the second output port 464 of switch 406. The second output port 464 of switch 406 is linked to the first input port 466 of switch 468. The first input port 466 of switch 468 is connected to the first output port 470 of switch 468. The first output port 470 of switch 468 is linked to the second input port 472 of switch 418. The second input port 472 of switch 418 is connected to the second output port 474 of switch 418. The second output port 474 of switch 418 is linked to the A input port of conferencing module 424. The A input port of conferencing module 424 is connected to the B output port and the C output port of conferencing module 424 since it is in the 4 state.

The B output port of conferencing module 424 is connected to the B input port and the A input port of conferencing module 424, consequently receiving signals from both those ports. The path that a transmit signal from station 3 hereafter follows to station 5 is the same as the path, previously described, that a signal from station 1 follows to station 5 from conferencing module 424.

The A input port of conferencing module 424 is also connected to the C output port of conferencing module 424. The C output port of conferencing module 424 is linked to the C input port of conferencing module 422. The C input port of conferencing module 422 is connected to the A output port of conferencing module 422 since it is in the 3 state. The A output port of conferencing module 422 is linked to the first input port 476 of switch 428. The first input port 476 of switch 428 is connected to the first output port 478 of switch 428. The first output port 478 of switch 428 is linked to the first input port 480 of switch 482. The first input port 480 of switch 482 is connected to the first output port 484 of switch 482. The first output port 484 of switch 482 is linked to the first input port 486 of switch 440. The first input port 486 of switch 440 is connected to the first output port 488 of switch 440. The first output port 488 of switch 440 is linked to the receive port of station 1.

The transmit port of station 5 is linked to the receive ports of stations 1 and 3 along the following path so a signal can be routed therebetween. The transmit port of station 5 is linked to the first input port 490 of switch 492. The first input port 490 of switch 492 is connected to the third output port 494 of switch 492. The third output port 494 of switch 492 is linked to the second input port 496 of switch 498. The second input port 496 is connected to the first output port 500 of switch 498. The first output port 500 of switch 498 is linked to the third input port 502 of switch 418. The third input port 502 is connected to the third output port 504 of switch 418. The third output port 504 of switch 418 is linked to the A input port of conferencing module 444, which is in the two state. The A input port of conferencing module 444 is connected to the C output port of conferencing module 444. The C output port of conferencing module 444 is linked to the C input port of conferencing module 424, which is in the 4 state. The C input port of conferencing module 424 is connected to the A output port and the C output port of conferencing module 424.

At the A output port of conferencing module 424 the transmit signal from station 5 is routed with a transmit signal from station 1. The path that a transmit signal from station 5 follows hereinafter to the receive port of station 3 is the same path that a transmit signal from station 1 follows to the receive port of station 3 from conferencing module 424.

At the C output port of conferencing module 424 a transmit signal from station 5 is routed along with a transmit signal from station 3. The path a transmit signal from station 5 follows hereinafter to the receive port of station 1 is the same path that a transmit signal from station 3 follows to the receive port of station 1 from conferencing module 424. The additional conferencing links are illustrated in FIG. 6. They are not described in detail since such a description is similar to the description of conference (1, 3, 5), except for the fact that different links and connections of the switches and conferencing modules exist.

In a preferred embodiment, to demonstrate a control algorithm for a conferencing network using switch modules and conferencing modules, the example of the conferences cited earlier is used: {1,3,5}, {2,7,10,11}, {4,13}, {6,8,12,15}, and {9,14,16}. It is useful in the following discussion to denote each of the sets of conferences as C1, C2, C3, C4, C5 where $C_1 = \{1,3,5\}$
$C_2 = \{2,7,10,11\}$
$C_3 = \{4,13\}$
$C_4 = \{6,8,12,15\}$
$C_5 = \{9,14,16\}$ In general a conferencing network involving k conferences can be denoted by the set $\{C_1, \ldots, C_k\}$.

The example of the formation of a conference using one of many possible control algorithms is implemented in the conferencing network shown in FIG. 25. This conferencing network, as described before, consists of six stages of (×4)-switch modules and one ring array of 16 conferencing modules placed between the third and fourth stages of the network. The control algorithm used for this embodiment takes into account details of the structure of the network, but it nevertheless is indicative of the generic operations which any control algorithm has to perform in a multi-stage switching network in which conferencing modules have been embedded.

To determine the proper routing through the stages of (×4)-switching modules in the network to realize the conferences existing in this example, the combinations of signals emanating from the transmit ports which must be produced and routed through the network to each of the receive ports must be considered. These combinations, which are shown in FIG. 25, can be denoted as follows:

Receive port 1→{3,5}

Receive port 2→{7,10,11}

Receive port 3→{1,5}

Receive port 4→{1,5}

Receive port 5→{1,3}

Receive port 6→{8,12,15}

Receive port 7→{2,10,11}

Receive port 8→{6,12,15}

Receive port 9→{14,16}

Receive port 10→{2,7,11}

Receive port 11→{2,7,10}

Receive port 12→{6,8,15}

Receive port 13→{4}

Receive port 14 →{9,16}

Receive port 15 →{6,8,12}

Receive port 16 →{9,14}

Each of these sets are referred to as Receive Port Sets and are denoted $\{RP1, RP2, \ldots, RP16\}$. For example, RP7 {2,10,11} and RP15={6,8,12}.

The RPj's must be produced by the conference modules in the ring arrays. The details of their production is, of course, application dependent. In general, however, their production involves signal processing techniques which are used to operate on the signals in some predetermined manner such that the resulting signal combinations as represented by the RPj's have the appropriate functional and time properties.

The underlying principal upon which the operation of the control algorithm is based is that in order to realize this (or any other) conference, each of the ports involved in a conference must be routed through the first three stages to inputs of adjacent conference modules in the conference module ring. These adjacent conference modules are then used to produce the appropriate RPj's. The RPj's are then routed through the last three stages of the network to the proper receive ports.

A critical aspect of the control algorithm operation is the order in which the ports are linked to the conferencing modules in the ring array.

Consider an ordered port listing corresponding to any permutation of the conferences (that is, the $C_i$'s) in a conferencing network $\{C_1, \ldots, C_k\}$. For example, the permutation $C_2, C_3, C_1, C_5, C_4$ corresponds to the ordered port listing (2,7,10,11,4,13,1,3,5,9,14,16,6,8,12,15)

$C_2, \quad C_3, \quad C_1, \quad C_5, \quad C_4$

As another example, the permutation $C_3, C_1, C_5, C_2, C_4$ corresponds to the ordered port listing (4,13,1,3,5,9,14,16,2,7,10,11,6,8,12,15)

$C_3$,  $C_1$,  $C_5$,  $C_2$,  $C_4$

Such ordered port lists are called Conference Module Input Lists (or CMIL's). To realize a conference, if the ports in the order of a CMIL are routed to the inputs of a ring array, then all the conferences in the conference network can be established by the conference modules. To illustrate this, the port list of the first CMIL given above is shown in FIG. 25 as being routed through the first three switching stages of the network to the output ports of the third stage of the network. It should be noted that these output ports are the inputs to the ring array 402. With this ordered set of ports linked to the inputs of the conference modules, the conference modules can be set into appropriate states such that each conference can be realized. This is illustrated in FIG. 25 for the CMIL given above. Also shown in FIG. 25 are RPj's emanating from each of the conference modules which must be routed through stages 4,5 and 6 to the proper receive ports.

Hence, for any permutation of the $C_i$'s there is a corresponding CMIL which represents an ordered list of ports that if connected in order to the inputs of the conference modules can be combined into the RPj's, $j=1, \ldots, N$ which must then be routed to the transmit ports.

The function of a control algorithm is now clear. The algorithm must generate a CMIL and then conduct the ordered list of port connections corresponding to that CMIL to the input ports of the ring array. FIG. 25 shows each $\times 4$-switch in the first three stages in a configuration which results in such a network for the given CMIL. Note that the switch connections and links of the last three stages of switch modules are "mirror-images" of the switch connections and links of the switch modules in the first three stages.

It should be clear that the ports in the $C_i$'s can be permuted and this still results in a CMIL that if linked in order to the A input ports of the conference modules can be combined into the necessary RPj's.

Finally, any rotation of a CMIL represents still another ordered list of ports which if linked and connected to the ring array could be combined into the necessary PRj's. For example, if the CMIL cited in the above paragraph were rotated two positions to the right the result is 6,8,10,11,2,7,13,4,5,1,3,16,14,9,12,15

$C_4$  $C_2$  $C_3$ $C_1$  $C_5$  $C_4$

A formal statement of the control algorithm is a follows:
Given: A conference connection denoted by $\{C_1, C_2, \ldots, C_k\}$
Step 1: Generate a CMIL
Step 2: Link the transmit ports to the A input ports of the ring array in the ordering of the CMIL.
Step 3: Generate the RPj's using the conference modules.
Step 4: Link the RPj's from the A output ports of the ring array to the receive ports using mirror image paths relative to the paths used from the transmit ports to the input ports of the conference ring.

All links and connections through the switching network can be accomplished using standard multi-stage switching network control algorithms. (For example, see "*Mathematical Theory of Connecting Networks and Telephone Traffic*," V. Benes, Academic Press, New York, N.Y., 1967.)

The above discussion assumed that a complete conference assignment, denoted by $\{C_1, C_2, \ldots C_k\}$, was given and it was necessary to establish the conferences composing this assignment. Alternatively, another situation of interest is that in which conferencing requests arrive individually and predictably, and must be satisfied by a conferencing network or ring in addition to existing conferences that have been previously established. Still another situation of interest is where a station can make a request to join an existing conference. For both of these cases, a modified control algorithm can determine the necessary paths to satisfy these requests. This algorithm will be referred to as the incremental control algorithm. The incremental control algorithm will be described in the following relative to the second of the two cases cited above.

An incremental control algorithm must take into account details of the structure of the ring/network configuration for which it is to establish paths. However, as with the algorithm described previously, an example of such an algorithm will be given relative to a particular network structure. It should be understood that this discussion entails operations generic to those that any incremental control algorithm has to perform on any structure utilizing programmable conference modules.

Figure 26:
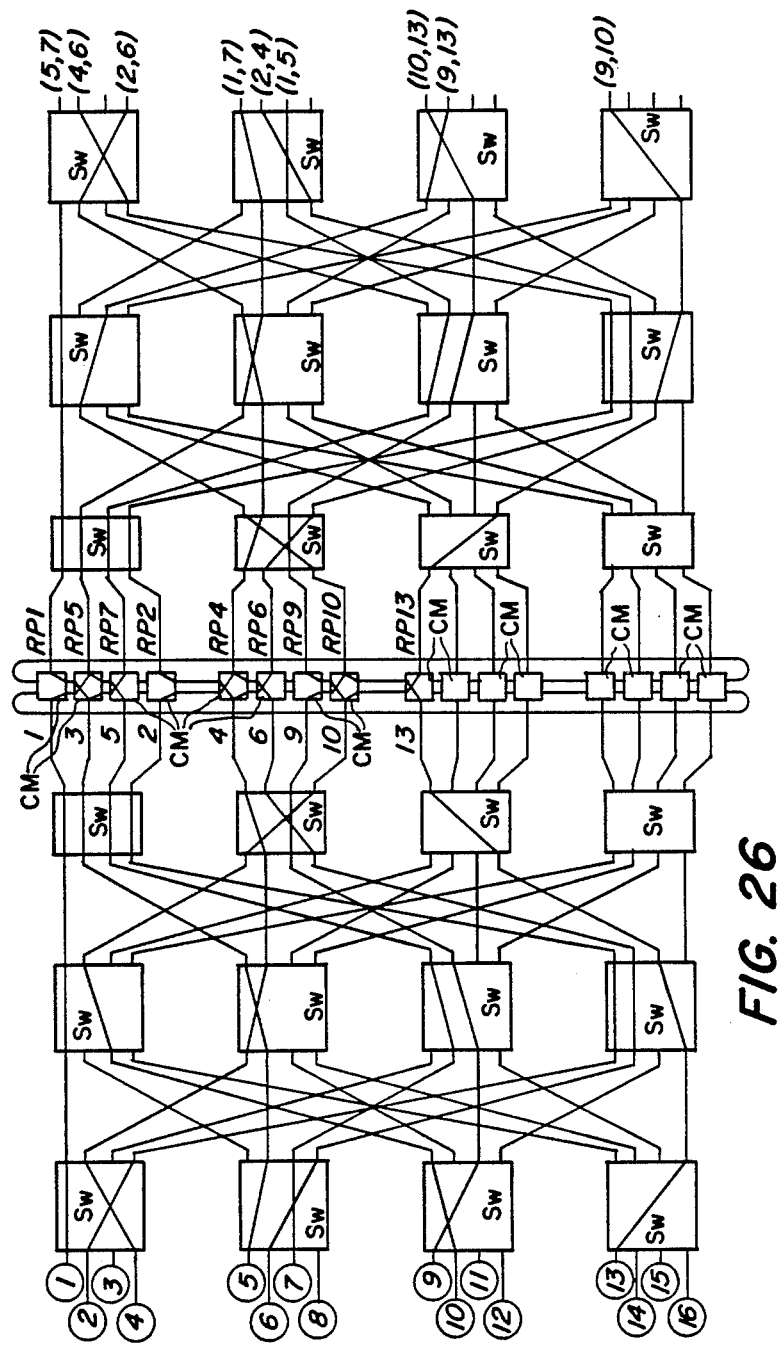
FIG. 26 shows a connection assignment realization of the conferencing network shown in FIG. 25.

Consider the conferencing network shown in FIG. 26. The conference assignment $\{C_1, C_2, C_3\} = (1,5,7)$, $(2,4,6)$, $(9,10,13)\}$ is shown as being implemented. It can be assumed that this was accomplished using the previously defined algorithm and the CMIL:

$C_1 C_2 C_3$

Now suppose that station 14 wants to join conference $C_2$ to form $C'_2 - (2,4,6,14)$. In other words, the new conference assignment to be satisfied is $\{C_1, C'_2, C_3\} = (1,5,7), (2,4,6,14), (9,10,13)\}$. In general, the conferencing network would be realizing the conferencing assignment $\{C_1, C_2, \ldots, C_{i-1}, C_{i+1}, \ldots C_k\}$, and station j would request to join $C_i$ to form $C_{i'}$.

In the specific example of FIG. 26, there is not an available programmable conference module adjacent to those used to realize $C_2$ such that $C_2'$ can be established. Thus, to add station 14 to $c_2$, some of the paths to/from programmable conference modules that are being used to establish the conferences $C_1, C_2$, and $C_3$ must be arranged. To describe such rearrangements, it is necessary to consider the ordered port listing associated with the CMIL as shown in FIG. 26:

(1,5,7,2,4,6,9,10,13)

$C_1$  $C_2$  $C_3$

It is useful to denote particular ports in this ordered port list as top ports and bottom ports relative to each conference. For example, in this ordered port list:

For $C_1$
    Port 1 is the top port
    Port 7 is the bottom port

-continued

For $C_2$
    Port 2 is the top port
    Port 6 is the bottom port

For $C_3$
    Port 9 is the top port
    Port 13 is the bottom port

Consider a modified port listing where 9 is moved from its current position of top port for $C_3$ to the position of bottom port of C3 (that is, 9 is moved to the bottom of the list), leaving a gap, denoted by $\phi$, in its original position:

(1,5,7,2,4,6, $\phi$,10,13,9)

Figure 27:
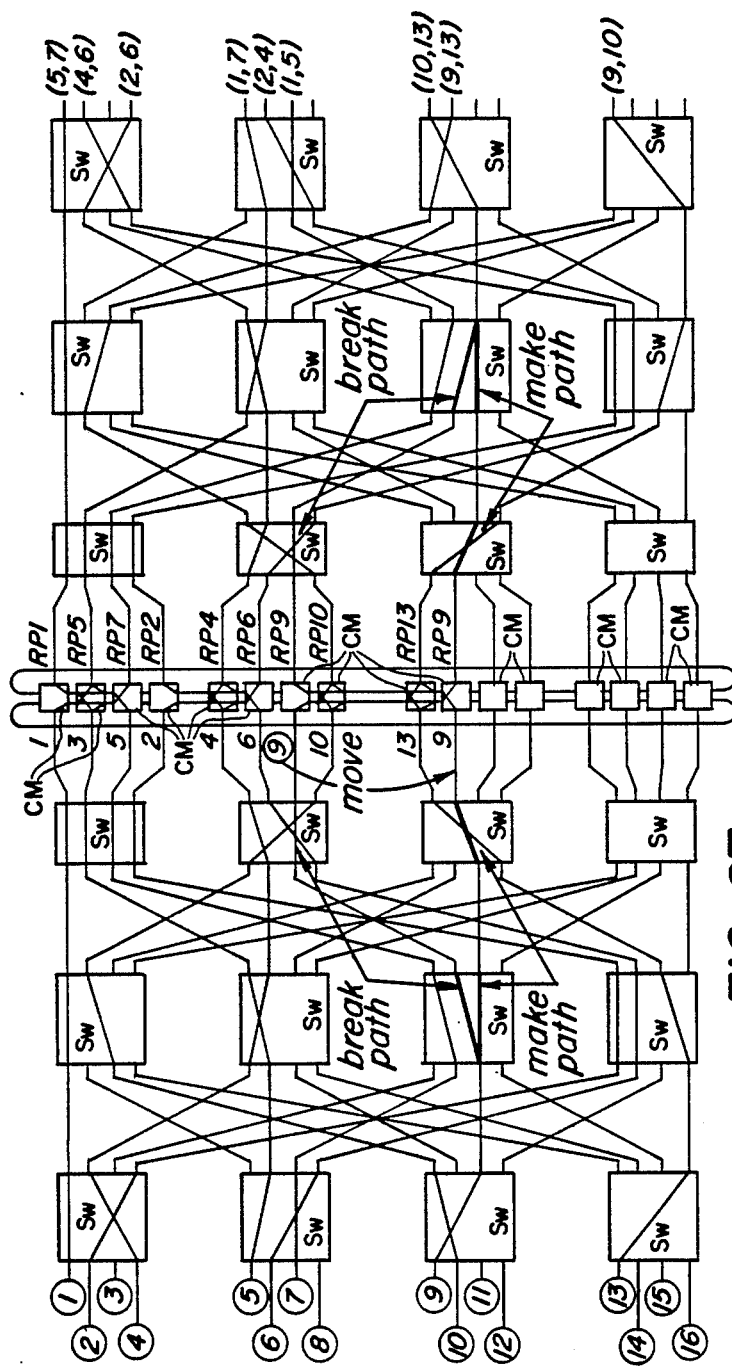
FIG. 27 shows a conferencing network modified to include an additional station in a conference based on the conferencing network shown in FIG. 25.
Figure 28:
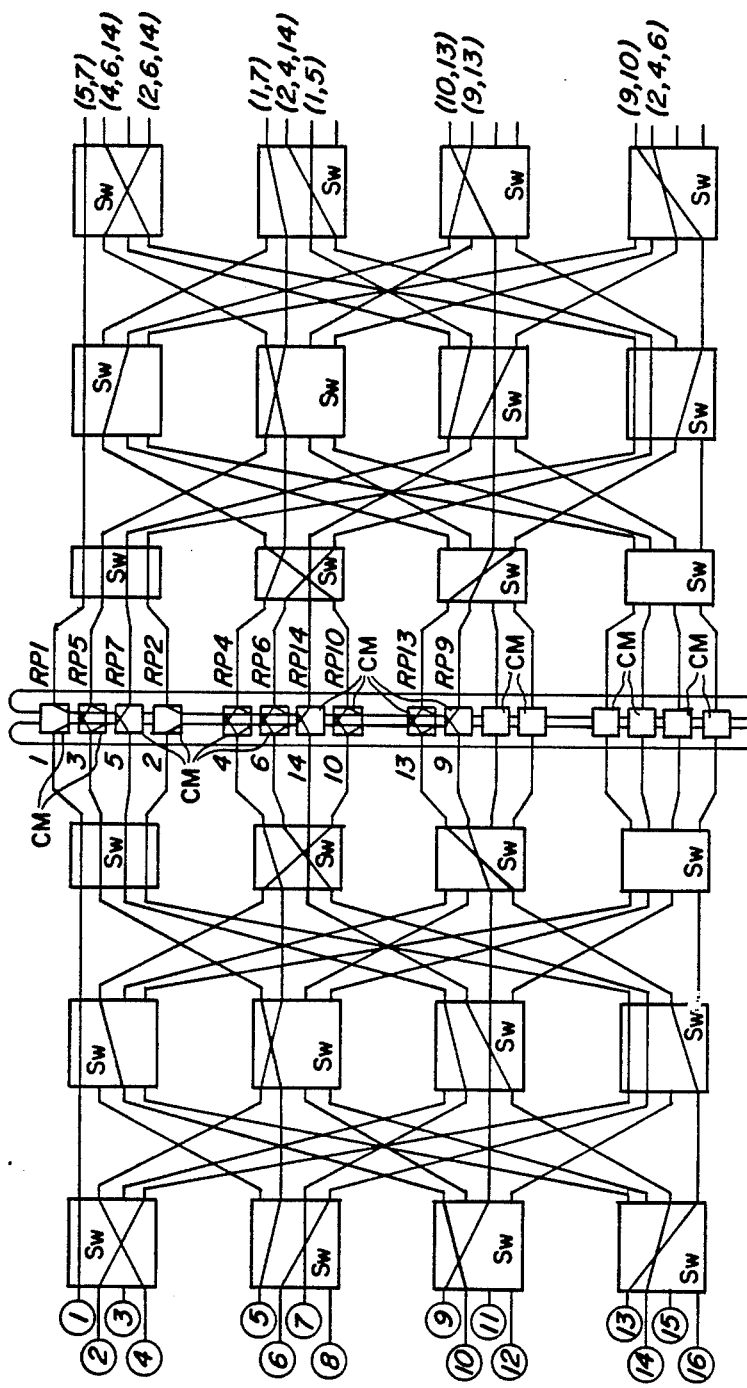
FIG. 28 shows the connection assignment realized after the modifications are made in the conferencing network shown in FIG. 27.

Relative to the network shown in FIG. 26, such a move corresponds to rearranging the connecting path to/from station 9 to utilize the programmable conference module beneath that used by station 13 to provide RP9. This is illustrated in FIG. 27. This move has opened a path to/from station 14 to the programmable conference module previously used by station 9. FIG. 28 shows station 14 utilizing this path such that the new conference assignment is realized.

An important aspect of the procedure just described should be stressed. Namely, the make path operation as shown in FIG. 27 should be performed before the break path operation. The effect of doing this is that in the period of time after the make but before the break (which should be only a momentary period of time), conference $C_3'$ is established where $C_3'$; =(9,10,13,9). In other words, conference C3 momentarily has two signal inputs from station 9. This means that, although involved in rearrangement, station 9 never is out of conference C3. A level control function implemented with the programmable conference modules can be used to alleviate any ramifications of this momentary double input condition.

A more general statement of the above procedure relative to the case where station j requests to join $C_i$ and where the ordered port listing corresponding to the CMIL of the current network implementation is $P_{1,t} \ldots, P_{1,b}, \ldots, P_{i-1,t}, \ldots, P_{i-1,b}, P_{i,t}, \ldots,$
$P_{i,b}, P_{i+1,t}, \ldots, P_{i+1,b} \ldots P_{k,t}, \ldots, P_{k,b}$ where $P_{q,t}$ is the top port for $C_q$ and $P_{q,b}$ is the bottom port of $C_q, q = 1, \ldots k$. The procedure would move Pk,t to the bottom of the list, and then move $P_{k-1,t}$ into the position in the list previously occupied by $P_{k,t}, \ldots$, and then move $P_{i+1,t}$ into the position previously occupied by $P_{i+2,t}$. This would leave a gap in the position previously occupied by $P_{i+1,t}$ which is at the bottom of the $C_i$ components of the list. This gap can then be filled by inserting j into it, making j the new bottom port of $C_i$ in this list. Because of the manner in which the ordered port listing is expanded by pushing ports of the list toward the bottom in this procedure to create a gap for j, this procedure is referred to as the bottom-pushing routine.

As an alternative to the bottom-pushing procedure, there could also be a top-pushing routine. The top-pushing routine is effectively the reverse of the bottom pushing routine as it begins by moving $P_{1,b}$ to the top of the list and then continues until a gap is created at the top of the $C_i$ components in the list.

Both the bottom-pushing routine and the top-pushing routine correspond to a sequence of make/break actions within a ring of programmable conference modules. These actions require that some connecting paths be rearranged through the switching module stages surrounding the programmable conference modules. The extent to which such rearrangements might be necessary is, of course, dependent on the network configuration utilized. However, rearrangement algorithms for switching networks are well known and can be utilized for this purpose.

Hence, a formal statement of the incremental control algorithm is as follows:

Given: An implemented conference assignment where the
implementation uses the CMIL: $C_1, C_2, \ldots, C_{i-1}, C_i, C_{i+1}, \ldots, C_k$; and an idle station, call it station j, that requests to join $C_i$.
Step 1: Determine whether the currently used CMIL provides an unused programmable conference module adjacent to the programmable conference modules establishing $C_i$. If so, rearrange the paths through the switching network to provide a path from station j to this programmable conference module. Then use this programmable conference module to add j to $C_i$ to form $C_i'$ and stop. Otherwise, go to Step 2.
Step 2: Create an unused programmable conference module adjacent to $C_i$ by a series of path moves corresponding to a bottom-pushing routine if $K-i \leq i$ or a top-pushing routine if $K-i > i$. Rearrange the connecting paths through the switching modules surrounding the programmable conference modules by means of an appropriate switching network rearrangement algorithm to accomplish this.
Step 3: Form $C_i$ with the unused programmable conference module made available (at either the top or the bottom of the $C_i$ components, depending on whether the bottom-pushing routine or the top-pushing routine was used). Stop.

Obviously, numerous (additional) modifications and variations of the present invention are possible in light of the above teachings. It is therefore to be understood that within the scope of the appended claims, the invention may be practiced otherwise than as specifically described herein.

We claim:
1. A conferencing network for establishing conference comprising:
a first, second and third station, each station having a transmit port and a receive port;
a first, second and third conferencing module capable of being in predetermined states, each conferencing module having an A input port and an A output port, said second and third modules having a B input port and a C output port, said first and second modules having a B output port and a C input port, said B output port and C input port of the first conferencing module linked to the B input port and C output port, respectively, of the second conferencing module, said B output port and C input port of the second conference module linked to the B input port and C output port, respectively, of the third conferencing module, the transmit port of the first, second and third stations linked to the A input port of the first, second and third conferencing modules, respectively, the receive port of the first, second and third stations linked to the A output port of the first, second and third conferencing modules, respectively such that said first, second and third conferencing modules form an open ring array;

and control means for placing the conferencing modules in the proper states to establish the desired conferences between the stations, said control means in connection with each conferencing module.

2. A conferencing network as described in claim 1 wherein the first module has a B input port and a C output port, and the third module has a B output port and a C input port and wherein the B input port and C output port of the first conferencing module is linked to the B output port and C input port, respectively, of the third conferencing module such that the first second and third conferencing modules form a ring array.

3. A conferencing network as described in claim 1 including a fourth station and a fourth, fifth sixth, seventh and eighth conferencing module, each of which has an A input port, an A output port, a B input port, a B output port, a C input port and a C output port, the A input port of the fourth conferencing module linked to the transmit port of the fourth section, the B input port and the C output of the fourth conferencing module is linked to the B output port and the C input port, respectively, of the third conferencing module such that the first, second, third and fourth conferencing modules form an open ring array, and the fifth, sixth, seventh and eighth conferencing modules form an open ringed array, with the fifth conferencing module linked to the sixth conferencing module, the sixth conferencing module linked to the seventh conferencing module, and the seventh conferencing module linked the eighth conferencing module, the A input port of the fifth, sixth, seventh and eighth conferencing modules linked to the A output port of the first, second, third and fourth modules, respectively, the A output port of the fifth, sixth, seventh and eighth conferencing modules linked to the receive ports of the first, second, third and fourth stations.

4. A conferencing module as described in claim 3 where the B output port and the C input port of the forth and eighth conferencing modules are linked to the B input port and C output port of the first and fifth conferencing modules, respectively, such that the first, second, third and forth conferencing modules form a first ring array and the fifth, sixth, seventh and eighth conferencing modules form a second ring array.

5. A conferencing network as described in claim 3 wherein the B input port and C output port of the first conferencing module are linked to the C output port and the B input port, respectively, of the fifth conferencing module, and the B output port and the C input port of the forth conferencing module are linked to the C input port and B output port, respectively, of the eighth conferencing module such that the first, second, third, forth, fifth, sixth, seventh and eighth conferencing modules form a weaved array.

6. A conferencing network as described in claims 4 or 5 including a switch having a first, second, third and forth input port and a first, second, third and forth output port, the A output ports of the first, second, third and forth modules linked to the first, second, third and forth input ports respectively, of the switch, and the first, second, third and forth output ports of the switch are linked to the A input ports of the first, second, third and forth conferencing modules, respectively; and said controlling means placing the switch in the proper connection to establish the desired conferences between the stations.

7. A conferencing network comprising N conferencing modules, each conferencing module having states wherein there is at least one conferencing state and at least one non-conferencing state and wherein a conferencing module which is non-participatory is not in any state, and M switches, where N is an integer greater than or equal to 1, and M is an integer greater than or equal to 0, and there are at least K stations where K is an integer greater than or equal to 3 such that the K stations are linked through the N conferencing modules and M switches so that each station is able to enter into a conference with the other stations.

8. A conferencing network comprising:
an open ring array comprised of K conferencing modules each conferencing module having states wherein there is at least one conferencing state and at least one non-conferencing state and wherein a conferencing module which is non-participatory is not in any state, and where $K \geq 3$ and an integer;
and means for controlling the open ring array such that the conferencing modules are placed in desired states, said control means in connection with each conferencing module.

9. A conferencing network as described in claim 8 including N additional open ring arrays, where $N \geq 1$ and is an integer, each of said additional ring arrays comprised of conferencing modules capable of being in desired states with each open ring array linked to another open ring array; and the controlling means controlling the conferencing modules of the ring arrays such that the conferencing modules are placed in the desired states.

10. A conferencing network as described in claim 9 wherein L of the N+1 open ring arrays are linked to form weaved arrays, where $N+1 \geq L \geq 2$ and is an even integer.

11. A conferencing network comprising:
a ring array comprised of K conferencing modules, each conferencing module having states wherein there is at least one conferencing state and at least one non-conferencing state and wherein a conferencing module which is non-participatory is not in any state, where $K \geq 3$ and an integer; and
means for controlling the open ring array such that the conferencing modules are placed in desired state, said control means in connection with each conferencing module.

12. A conferencing network as described in claim 8 including N additional ring arrays, where $N \geq 1$ and is an integer, each of said additional ring arrays comprised of conferencing modules capable of being in desired states with each ring array linked to another ring array; and the controlling means controlling the conferencing modules of the ring arrays such that the conferencing modules are placed in the desired states.

13. A conferencing network as described in claim 8 including a switching stage linked to the ring array, said switching stage having s switches capable of being in a desired connection, where $s \geq 1$ and is an integer.

14. A conferencing network as described in claim 11 including a switching stage linked to the ring array, said switching stage having s switches capable of being in a desired connection, where $s \geq 1$ and is an integer.

15. A conferencing network as described in claim 9 including M switching stages having S switches capable of being in a desired connection with J of the M switching stages linked to a ring array, where $S \geq 1$ and is an integer, $M \geq 1$ and is an integer, and $M \geq 1$ and is an integer.

16. A conferencing network as described in claim 10 including M switching stages having S switches capable of being in a desired connection with J of the M switching stages linked to a ring array, where $S \geq 1$ and is an integer, $M \geq 1$ and is an integer, and $M \geq J \geq 1$ and is an integer.

17. A conferencing network as described in claim 11 including M switching stages having S switches capable of being in a desired connection with J of the M switching stages linked to a ring array, where $S > 1$ and is an integer, $M \geq 1$ and is an integer, and $M \geq J\ 1$ and is an integer.

18. A conferencing network as described in claim 12 including M switching stages having S switches capable of being in a desired connection with J of the M switching stages linked to a ring array, where $S \geq 1$ and is an integer, $M \geq 1$ and is an integer, and $M \geq J \geq 1$ and is an integer.

19. A conferencing network as described in claims 15, 16, 17 or 18 including K stations linked to a ring array.

20. A conferencing network as described in claims 15, 16, 17 or 18 including K stations linked to a switching stage.

21. A conferencing network comprising:
K stations, each of said K stations having a transmit port and a receive port, where $K \geq 3$ and is an integer;

M ring arrays, where M is $\geq 1$ and is an integer, each of said M ring arrays having K conferencing networks capable of being in desired states each of said K conferencing modules having at least K input ports and K output ports, each of the K transmit ports of the K stations are linked to each of K input ports, respectively, of a ring array, and each of the K receive ports of the K stations are linked to each of the K output ports, respectively, of a ring array; and means for controlling the M ring arrays such that the conferencing modules are placed in the desired states said control means in connection with each conferencing module.

22. A conferencing network as described in claim 8 wherein $N \geq 2$ and is an integer, and including M switching stages having K input ports and K output ports and capable of forming desired connections therebetween where $M \geq 1$ and is an integer, the K input ports of a first open ring array of the M ring arrays linked to the K output ports, respectively, at a switching stage, and the K output ports of a second open ring array of the M open ring arrays linked to the K input ports of a switching stage, and the controlling means placing the input ports and the output ports of the switching stage into the desired connections.

23. A conferencing network as described in claim 11 wherein $N \geq 2$ and is an integer, and including M switching stages having K input ports and K output ports and capable of forming desired connections therebetween where $M \geq 1$ and is an integer, the K input ports of a first ring array of the M ring arrays linked to the K output ports, respectively, at a switching stage, and the K output ports of a second ring array of the M ring arrays linked to the K input ports of a switching stage, and the controlling means placing the input ports and the output ports of the switching stage into the desired connections.

24. A conferencing network comprised of K stations, each of said K stations having a transmit port and a receive port, where $K \geq 3$ and is an integer; N ring arrays, where M is $\geq 1$ and is an integer, each of said N ring arrays having K conferencing networks capable of being in desired states, each of said K conferencing modules capable of being in desired states, said conferencing modules having at least K input ports and K output ports, each of said K transmit ports of the K stations are linked to the K input ports of a ring array; M switching stages having K input ports and K output ports and capable of forming desired connections therebetween, where $M \geq 1$ and is an integer, the K output port of a ring array linked to the K input ports of a switching stage, the K receive ports of the K stations linked to the K output ports of a switching stage; and means for controlling the N ring arrays such that the conferencing modules are placed in the desired states, and the switching stages such that the K input ports and K output ports of the switching stage are placed in the desired connections aid control means in connection with each conferencing module.

25. A conferencing network comprised of K stations, each of said K stations having a transmit port and a receive port, where $K \geq 3$ and is an integer; N ring arrays, where N is $\geq 1$ and is an integer, each of said N ring arrays having K conferencing networks capable of being in desired states, each of said K conferencing modules capable of being in desired states, said conferencing modules having at least K input ports and K output ports, N switching stages having K input ports and K output ports and being capable of forming desired connections therebetween, where $M \geq 1$ and is an integer, each of said K transmit ports of the K stations linked to the K input ports of a switching stage, each of said K output ports of switching stage linked to the K input ports of a ring array, each of said K output ports of a ring array linked to the K receive ports of the K stations; means for controlling the N ring arrays such that the conferencing modules are placed in the desired states, and the switching stages such that the K input ports and K output ports of the switching stage are placed in the desired connections said control means in connection with each conferencing module.

26. A conferencing network comprised of K stations, each of said K stations having a transmit port and a receive port, where $K \geq 3$ and- is an integer; N ring arrays, where. M is $\geq 1$ and is an integer, each of said N ring arrays having K conferencing networks capable of being in desired states, each of said K conferencing modules capable of being in desired states, said conferencing modules having at least K input ports and K output ports, M switching stages having K input ports and K output ports and being capable of forming desired connections therebetween, where $M \geq 2$ and is an integer, each of said K transmit ports of the K stations linked to the K input ports of a switching stage, each of said K output ports of switching stage linked to the K input ports of a ring array, each of said K output ports of a ring array linked to the K input ports of a switching stage each of said K output ports of a switching stage linked to the K receive ports of the K stations; means for controlling the N ring arrays such that the conferencing modules are placed in the desired states, and the switching stages such that the K input ports and K output ports of the switching stage are placed in the desired connections said control means in connection with each conferencing module.

* * * * *

UNITED STATES PATENT AND TRADEMARK OFFICE
CERTIFICATE OF CORRECTION

PATENT NO. : 4,945,534
DATED : July 31, 1990
INVENTOR(S) : JOHN L. DRISCOLL, ET AL.

It is certified that error appears in the above—identified patent and that said Letters Patent is hereby corrected as shown below:

In column 3, line 4, the phrase "a ring array." should be deleted.

In column 3, line 43, the parenthetical phrase "(Cmas denoted in the figures)" should be --(CM as denoted in the figures)--.

In column 8, line 59, the term "(XI)" (both occurrences) should be --(3X1)--.

In column 13, line 7, the numeral "18" should be --318--.

In column 13, line 9, the letter "I" should be the numeral --1--.

In column 15, line 51, the term "four" should be the numeral --4--.

In column 17, line 52, the term "(X4)" should be --(4X4)--.

In column 17, line 61, the term "(X4)" should be --(4X4)--.

In column 18, at approximately line 7, the phrase "Receive port 4 --> {1,5}" should be --Receive port 4 --> {13}--.

In column 18, line 32, the term "RP7{2,10,11}" should be --RP7={2,10,11}--.

UNITED STATES PATENT AND TRADEMARK OFFICE
CERTIFICATE OF CORRECTION

PATENT NO. : 4,945,534

DATED : July 31, 1990

INVENTOR(S) : JOHN L. DRISCOLL, ET AL.

It is certified that error appears in the above—identified patent and that said Letters Patent is hereby corrected as shown below:

In column 18, at approximately line 58, the list "C2, C3, C1, C5, C4 should be --$C_2$, $C_3$, $C_1$, $C_5$, $C_4$--.

In column 19, line 35, the term "X4-switch" should be --4X4-switch--.

In column 20, line 44, the term "$\{C_{1C}\ C'_2\ C_3\}$" should be --$\{C_1\ C'_2\ C_3\}$--.

In column 20, line 46, the term "$\{C_1, C_2, \ldots, C_{i-1}, C_{i+1}, \ldots C_k\}$" should be --$\{C_1, C_2, \ldots, C_{i-1}, C_{i+1}, \ldots C_k\}$--

In column 20, line 50, the term "$C_2'$" should be --$C_2$--.

In column 21, line 33, the term "$C_3'$" (both occurrences) should be --$C_3$--.

In column 21, line 50, the term "Pk,t" should be --$P_{k,t}$--.

In column 22, line 26, the term "$C_i'$" should be --$C_i$--.

In Claim 2, column 23, line 18, the phrase "first second" should be --first, second--.

In Claim 3, column 23, line 21, the phrase "fifth sixth" should be --fifth, sixth--.

UNITED STATES PATENT AND TRADEMARK OFFICE
CERTIFICATE OF CORRECTION

PATENT NO. : 4,945,534

DATED : July 31, 1990

INVENTOR(S) : JOHN L. DRISCOLL, ET AL.

It is certified that error appears in the above—identified patent and that said Letters Patent is hereby corrected as shown below:

In Claim 3, column 23, line 36, the term "to" should be inserted after --linked--.

In Claim 17, column 25, line 16, the mathematical relationship "S>1" should be --$S \geq 1$--.

In Claim 17, column 25, line 17, the mathematical relationship "$M \geq J$ 1" should be --$M \geq J \geq 1$--.

In Claim 24, column 26, line 6, the letter "M" should be --N--.

In Claim 24, column 26, line 22, the term "aid" should be --said--.

In Claim 26, column 26, line 47, the term "and-" should be --and--.

Signed and Sealed this

Twenty-ninth Day of September, 1992

Attest:

DOUGLAS B. COMER

Attesting Officer        Acting Commissioner of Patents and Trademarks

UNITED STATES PATENT AND TRADEMARK OFFICE
CERTIFICATE OF CORRECTION

PATENT NO. : 4,945,534
DATED : July 31, 1990
INVENTOR(S) : JOHN L. DRISCOLL, ET AL.

It is certified that error appears in the above—identified patent and that said Letters Patent is hereby corrected as shown below:

In Claim 15, column 25, line 5, the term "$M \geq 1$" should be --$M \geq J \geq 1$--;

In Claim 4, column 23, line 46 and line 49, the term "forth" should be --fourth--;

In Claim 5, column 23, line 57 and line 60, the term "forth" should be --fourth--;

In Claim 6, column 23, line 64, the term "forth" (both occurrences) should be --fourth--;

In Claim 6, column 23, line 66, line 67, and line 68, the term "forth" should be --fourth--;

In Claim 6, column 24, line 2, the term "forth" should be --fourth--;

In Claim 13, column 24, line 63 and line 64, the letter "s" should be --S--;

In Claim 14, column 24, line 67 and line 68, the letter "s" should be --S--;

UNITED STATES PATENT AND TRADEMARK OFFICE
CERTIFICATE OF CORRECTION

PATENT NO. : 4,945,534

DATED : July 31, 1990

INVENTOR(S) : JOHN L. DRISCOLL, ET AL.

It is certified that error appears in the above—identified patent and that said Letters Patent is hereby corrected as shown below:

In Claim 21, column 25, lines 34-35, the term "networks" should be --modules--;

In Claim 21, column 25, line 35, after the term "states" insert --,--;

In Claim 21, column 25, line 38 and line 40, the term "are" should be --being--;

In Claim 22, column 25, line 47, the numeral "8" should be --9--;

In Claim 23, column 25, line 59, the numeral "11" should be --12--;

In Claim 24, column 26, lines 7-8, the phrase "networks capable of being in desired states," should be --modules,--;

In Claim 24, column 26, line 12, the term "are" should be --being--;

In Claim 25, column 26, lines 28-29, the phrase "networks capable of being in desired states," should be --modules,--;

In Claim 26, column 26, line 48, the letter "M" should be --N--;

UNITED STATES PATENT AND TRADEMARK OFFICE
CERTIFICATE OF CORRECTION

PATENT NO. : 4,945,534
DATED : July 31, 1990
INVENTOR(S) : JOHN L. DRISCOLL, ET AL It is certified that error appears in the above-indentified patent and that said Letters Patent is hereby corrected as shown below:

In Claim 26, column 26, lines 49-50, the phrase "networks capable of being in desired states," should be --modules,--.

Signed and Sealed this

Twenty-ninth Day of June, 1993

Attest:

MICHAEL K. KIRK

Attesting Officer

Acting Commissioner of Patents and Trademarks